US006776540B2

(12) United States Patent
Toyoda

(10) Patent No.: US 6,776,540 B2
(45) Date of Patent: Aug. 17, 2004

(54) SHUTTER DEVICE

(75) Inventor: Yasuhiro Toyoda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/371,345

(22) Filed: Feb. 20, 2003

(65) Prior Publication Data
US 2003/0161624 A1 Aug. 28, 2003

(30) Foreign Application Priority Data

Feb. 22, 2002 (JP) ........................................ 2002-045555
May 30, 2002 (JP) ........................................ 2002-157565

(51) Int. Cl.$^7$ ................................................ G03B 9/40
(52) U.S. Cl. ..................................... 396/484; 396/487
(58) Field of Search ................................ 396/484–490

(56) References Cited

U.S. PATENT DOCUMENTS

| 4,737,808 A | * | 4/1988 | Toyoda ........................ 396/489 |
| 5,875,368 A | * | 2/1999 | Hasuda et al. ............... 396/484 |
| 6,106,165 A | * | 8/2000 | Tanabe ........................ 396/471 |
| 6,637,955 B2 | | 10/2003 | Toyoda | |

FOREIGN PATENT DOCUMENTS

| JP | 2001-305606 | 11/2001 |
| JP | 2001-305607 | 11/2001 |
| JP | 2001-305608 | 11/2001 |
| JP | 2001-343676 | 12/2001 |

* cited by examiner

Primary Examiner—David M. Gray
(74) Attorney, Agent, or Firm—Robin, Blecker & Daley

(57) ABSTRACT

A shutter device of the invention includes: a shutter base plate having a shutter opening; a first arm member which rotates with a first shaft as a rotation center relative to the shutter base plate; a second arm member which rotates with a second shaft as a rotation center relative to the shutter base plate; and plural shutter blades, wherein each of the plural shutter blades is joined to the first and second arm members and when the first and second arm members rotate with respect to each shaft, the plural shutter blades travel over the shutter opening in a predetermined direction, and in a state in which the plural shutter blades are positioned in their overlapping state, when an angle formed between a line connecting the rotation center of the first arm with a connecting center to the first arm member of a shutter blade, located on a front end side (opposite side to the first rotation center) of the first arm member and a direction perpendicular to the predetermined direction is assumed to be α, a condition of $45° \leq α \leq 50°$ is satisfied. Consequently, the size of the shutter device in a direction perpendicular to the traveling direction of the shutter can be reduced.

2 Claims, 21 Drawing Sheets

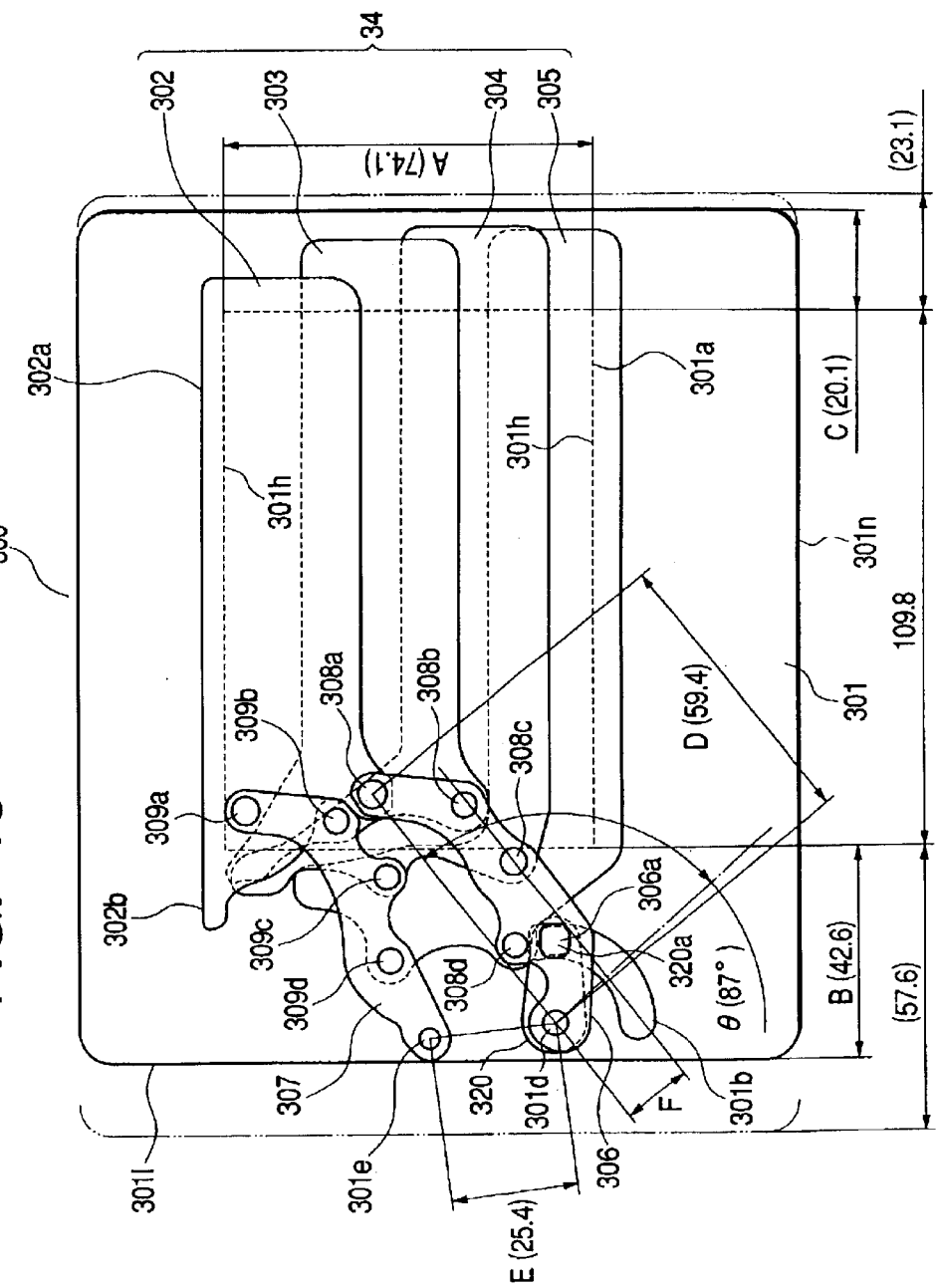

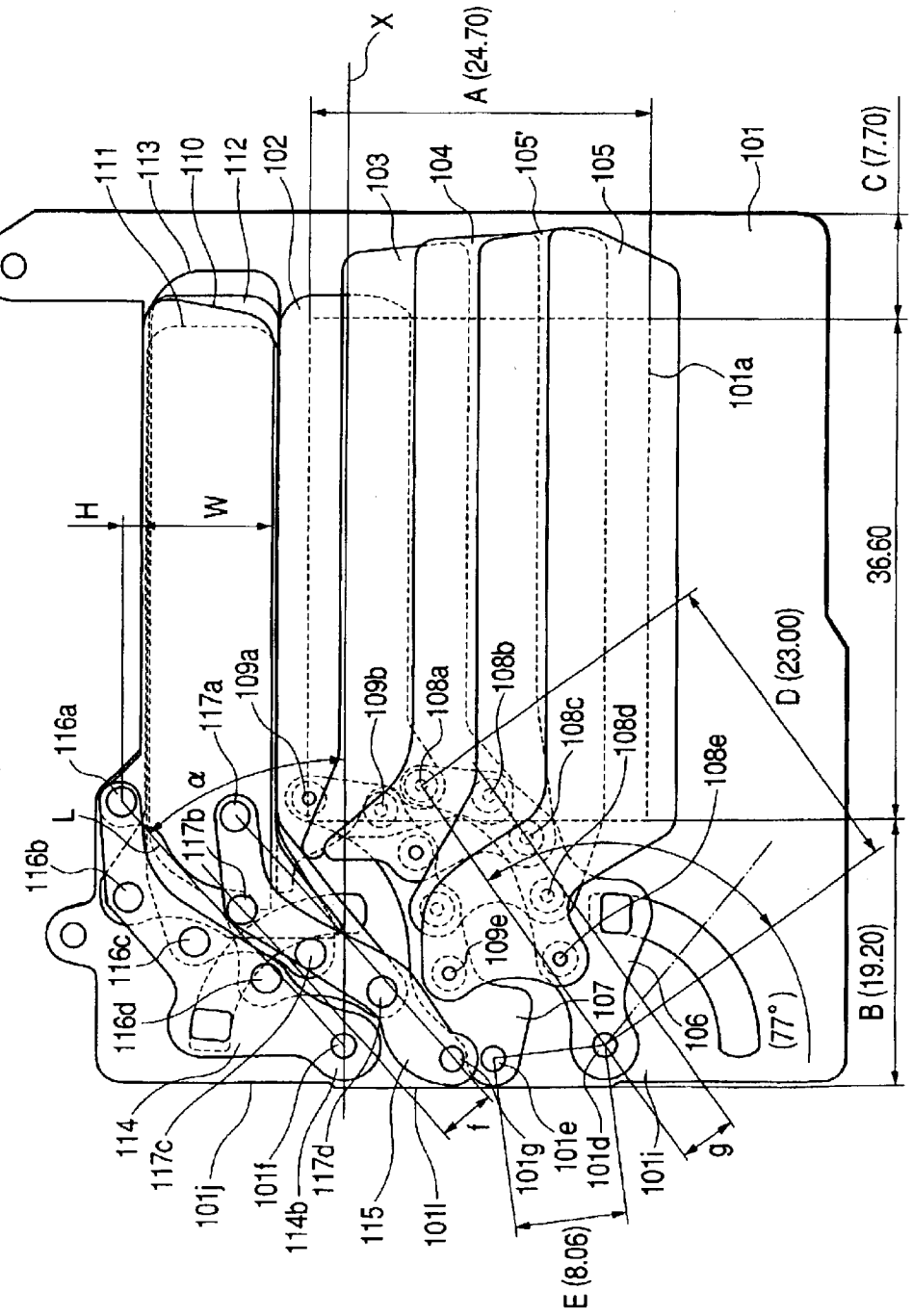

SHUTTER DEVICE

BACKGROUND OF THE INVENTION

1. Field of the Invention

The present invention relates to a shutter device for use in a camera, an image display device and other devices.

2. Related Background Art

Many kinds of cameras and the like employ a focal plane shutter in which a blade group, which is divided to plural pieces by a parallel link mechanism constituted of two arms, is supported freely rotatably. As for the type of the parallel link mechanism used for such a focal plane shutter, according to a long-arm type, an arm proximal end is mounted freely rotatably on one portion of both side portions of a shutter opening in a shutter base plate, while a portion on the arm front end side is joined to the other side of the blade group (the arm being disposed such that it strides over from one side of the shutter opening to the other side), and according to a short-arm type, an arm proximal end is mounted freely rotatably on one portion of both side portions of the shutter opening in the shutter base plate while a portion on the arm front end side is joined to the one side of the blade group (the arm being disposed such that it does not stride over from one side of the shutter opening to the other side).

As the focal plane shutter, a so-called vertically-traveling type focal plane shutter in which the blade group travels vertically has been often used.

In the long-arm type of the vertically-traveling type focal plane shutter, as disclosed in Japanese Utility Model Publication No. 35-29651, the blade group is held freely rotatably on an opposite side to the arm proximal end across the shutter opening. For the reason, the arms are formed longer than the width of the shutter opening.

Because, in the long-arm type, a rotation angle of the arm necessary for opening/closing the shutter opening by means of the blade group may be small, a deflection amount in a direction (lateral direction) perpendicular to the traveling direction of the blade group upon opening/closing operation is small, which is advantageous for reduction of the lateral width of the shutter. If the number of the blades held by two arms is three or more, the structure becomes complicated and long arms need to be used. Thus, inertia of a blade unit comprised of the blade group and arms increases, which is disadvantageous for high-speed operation of the shutter.

For the reason, with increased speed in exposure second-basis time of a shutter and increased speed in flash light emission synchronous second-basis time in recent years, the long-arm type not suitable for high-speed operation has been refrained from use.

On the other hand, although the short-arm type is disadvantageous for reduction of the lateral width as compared to the long-arm type, its arms do not stride over the shutter opening and a plurality of blades are supported freely rotatably with two arms on a side near the arm proximal end. Further, to decrease inertia by the traveling of the blades, it is preferable that the arm length is as short as possible.

The structure and dimensions of respective components of the short-arm type focal plane shutter are shown in FIGS. 22 to 24 (FIG. 22 shows a traveling preparation completion state, FIG. 23 shows a traveling completion state, and FIG. 24 shows a state of blade movable end (over-charge max)).

In this shutter device, proximal ends of a first front curtain arm 106 and a second front curtain arm 107 are mounted freely rotatably around shafts 101d, 101e on a shutter base plate 101 having a shutter opening 101a. A slit forming blade 102 and four covering blades 103, 104, 105, 105', which constitute the front curtain having five-blade structure are mounted freely rotatably on the two front curtain arms 106, 107 through caulking dowels 108a to 108e and 109a to 109e so as to form parallel links.

Further, proximal ends of a first rear curtain arm 114 and a second rear curtain arm 115 are mounted freely rotatably around shafts 101f, 101g on the shutter base plate 101. Then, a slit forming blade 110 and three covering blades 111, 112, 113, which constitute the rear curtain having four-blade structure, are mounted freely rotatably on the two rear curtain arms 114, 115 through caulking dowels 116a to 116d and 117a to 117d so as to form parallel links.

On the front curtain side and the rear curtain side, the blade caulking dowels are arranged such that they draw a smooth curve. The first arm and the second arm are disposed adjacent each other in a state in which the front curtain and the rear curtain overlap (hereinafter, this shutter device is called a first conventional example).

In addition, Japanese Utility Model Publication No. 6-26896 has disclosed a shutter device which adopts a third (further, a fourth) auxiliary arm to achieve miniaturization for a reason that the miniaturization is impossible with the parallel link composed of two arms. In this shutter device, when blades are overlapped, first and second arm supporting portions for supporting the slit forming blades are accommodated in an accommodating region existing between a finder and an opening window and the third arm for supporting other covering blades is located out of the region, thereby reducing the external shape dimensions in the horizontal direction of the shutter device.

Because in this shutter device, three arms are disposed in a small space, each arm is formed narrow and the rotation center of the proximal end of the third arm exists between the proximal end rotation center of the first arm and the caulking dowel of the third covering blade when blades are overlapped, while the caulking dowel of the third covering blade on the first arm exists between the proximal end rotation center of the third arm and the caulking dowel of the third covering blade (hereinafter, this shutter device is called a second conventional example).

Moreover, a shutter device (hereinafter this is called a third conventional example) disclosed by Japanese Utility Model No. 2501747 is provided with a slit forming blade driven by a first parallel link mechanism and covering blades driven by a second parallel link mechanism. A joining distance of the first parallel link on the slit forming blade is made longer than the joining distance of the second parallel link on the covering blade so as to maintain parallelism of the slit forming blades and reduce space from the shutter opening to the proximal end side of each parallel link.

On the other hand, Japanese Utility Model Publication No. 59-28414 has disclosed a focal plane shutter in which at least the slit forming blades in opening/closing blade groups divided to plural pieces are driven vertically by a parallel crank mechanism below a finder disposed on the top of a camera main body. Of both blade groups in this device, the degree of dividing of a blade group folded upward is made higher than the degree of dividing of a lower blade group, and of the upper blade group, at least pairing components constituting the parallel crank mechanism on the slit forming blade are located out of a region restricted in a vertical direction of the finder portion. Further, a top portion of the pairing portion is located above the lower edge of the finder portion so as to prolong the length of a section in the vertical direction. Consequently, a slit width upon exposure operation is stabilized and the top end of the shutter located at the top of the shutter opening is brought near the shutter opening without affecting exposure badly so as to set the finder position near the opening, thereby reducing the camera size (hereinafter this is called a fourth conventional example).

Generally, if the reduction in shutter size, particularly the lateral width, is achieved, the number of joint sections between the arm and the blade decreases as the number of divided blades decreases. Thus, area occupied by the joint sections decreases, which is advantageous for reduction of the lateral size.

In contrast, if the number of the blades is decreased, the overlapping amount of blades for shielding the shutter opening of a predetermined size decreases, thereby making it difficult to secure light shielding performance. In addition, because the width of each blade cannot be made so smaller, this measure is disadvantageous for reducing the size in a height direction by bringing a shutter top end located at the top of the shutter opening to near the shutter opening.

If the arm length is shortened to aim at the reduction of the size according to the first conventional example, freedom of supporting positions for supporting the covering blades freely rotatably drops because the front curtain is comprised of five blades and the blade caulking dowels are arranged just in line with each small interval. Thus, an interference occurs in the blade unit (for example, an interference between the outer periphery of a proximal end 106b of the first arm 106 and outer peripheries of the second arm 107 and covering blade 105' around the blade caulking dowel 109e, an interference between the outer periphery of the first arm 106 around the blade caulking dowel 108e and the outer peripheries of the second arm 107 and covering blades 104, 105 around the blade caulking dowels 109c, 109d and the like). Therefore, a rotation operating angle of the arm cannot be increased (because the size of the shutter opening in the blade traveling direction is specified, if the arm length in the parallel link is decreased, it is necessary to increase the arm rotation operating angle to move the blade by a specified distance). Further, there exists such an inconvenience that the overlapping amount between the slit forming blade and the covering blade is difficult to maintain when the blades are expanded to close the shutter opening, which blocks an effective reduction of the size.

On the other hand, when the rear curtain having the four-blade structure is used commonly for the front curtain, the overlapping amount of blades is as small as about 2 mm when the rear curtain is expanded. Even if the respective blades are expanded within a range permitted by the blade storage space in the overlapping state in which the front curtain opens the shutter opening, the freedom of supporting positions which support the covering blades freely rotatably is decreased by restriction on the arrangement of the blade caulking dowels, because the blade caulking dowels are arranged just in line with a small interval like the above-described blade having five-blade structure. Consequently, an interference occurs in the blade unit (for example, an interference between the outer periphery of the proximal end 114b of the first arm 114 and outer peripheries of the second arm 115 and covering blades 113 around the caulking dowel 117d, an interference between the outer periphery of the first arm 114 around the blade caulking dowel 116d and the outer peripheries of the second arm 115 and covering blade 112 around the blade caulking dowel 117c and the like). Therefore, the blade traveling distance can be expanded only by about 1 mm in the blade traveling direction and in its opposite direction. As a result, the desired overlapping amount of 4 mm cannot be secured and further, no remarkable reduction of the size is achieved. As regards a description about the arrangement of the caulking dowels, see (6) described later.

Further, in the first conventional example, the rear curtain which is overlapped on the top portion of the shutter, affecting the lower edge position of the finder portion of a single lens reflex camera will be described below.

When the first arm 114 is located at its movable end in the rear curtain overlapping state, an angle formed between a line L connecting the rotation center of the proximal end of the first arm 114 and the rotation center of a front end caulking dowel 116a of the same arm and a direction parallel to the shutter opening face and perpendicular to the blade group traveling direction (for example, line X) is assumed to be $\alpha$. At this time, $\alpha$ is 41.5°.

When a dimension from the rotation center of the proximal end of the first and second arms constituting a parallel link to the rotation center of a caulking dowel supporting the slit forming blade at the arm front end is assumed to be D, because the D is 23 mm, a traveling distance $\Delta y$ of the slit forming blade 111 per unit angle in the traveling direction from a state in which the first arm 114 is located at the operable end when the rear curtain is overlapped is 0.3 mm/deg.

Unless no adjustment or the like is made in the focal plane shutter, the start position held before exposure of the blades or the over-charge position may be deflected by about 1° in terms of the arm rotation angle due to disparity of component accuracy or assembly error.

Therefore, although the rear curtain is held at the start position with an angle 38.5°, which is in the vicinity of this angle $\alpha$=41.5°, because the $\Delta y$ is as relatively large as 0.32 mm/deg, deflection in the position (angle) held by a control magnet (not shown) affects deflection in the start position of the rear curtain slit forming blade 111 largely. For the reason, there is such an inconvenience that it is difficult to hold the second-basis time accuracy in an excellent condition because the deflection in the start position of the rear curtain slit forming blade 111 affects the shutter second-basis time accuracy directly.

Likewise, because the traveling distance of the slit forming blade 111 per unit angle at the rear curtain maximum charging angle (over-charge max), which coincides with the aforementioned $\alpha$, is substantially equal to $\Delta y$=0.3 mm/deg, which is still relatively large, the lower edge position of the finder portion has to be determined by providing with an allowance considering this deflection. Therefore, there is such an inconvenience that the height of the camera is raised by the amount corresponding to this allowance.

Because according to the second conventional example, the third arm for supporting the covering blade group is attached, the structure is more complicated as compared to a general parallel link mechanism constituted of two arms like the first conventional example and operating resistance is increased, so that inertia of the blade unit is also increased.

Also, because three arms are disposed in a small space, each arm is formed narrow, so that the strength of the arm itself drops. Further, because when the blades are overlapped, supporting portions of the first and second arms for supporting the slit forming blade are accommodated in an accommodating region existing between the finder and the opening window, the joining distance on the slit forming blade of the parallel link is decreased, so that the parallelism of an exposure slit is difficult to maintain.

Because, as for numerical values corresponding to the first conventional example, it comes that α=30°, D=24 mm, Δy=0.36 mm/deg, deflection in the start position of the rear curtain slit forming blade is so large that the second-basis time is difficult to maintain excellently. Further, because deflection of the rear curtain maximum charging angle (over-charge max) is large, the lower edge position of the finder portion has to be determined by providing with an allowance considering this, so that the height of the camera is increased by just the amount corresponding to this allowance.

Further, according to the third conventional example, a single blade unit is provided with two parallel link mechanism and the third arm (further, a fourth arm) for supporting the covering blade group is added. Therefore, its structure becomes more complicated as compared to a general parallel link mechanism constituted of two arms like the first conventional example and additionally, operating resistance is increased, so that inertia of the blade unit is also increased.

Also, because three (or four) arms are disposed in a space reduced for miniaturization, each arm is formed narrower, so that the strength of the arm itself drops.

Further, a numerical value corresponding to the above described first conventional example is α=40° and if D=23 mm is assumed like the first conventional example, it comes that Δy=0.31 mm/deg. Therefore, deflection in the start position of the rear curtain slit forming blade is large, so that the second-basis time accuracy is difficult to maintain excellently. In addition, because deflection in the rear curtain maximum charging angle (over-charge max) is large also, the lower edge position of the finder portion has to be determined by providing with an allowance considering this deflection, so that the height of the camera is increased just by the amount corresponding to this allowance.

The fourth conventional example does not state anything about reduction in size of the lateral width of the shutter and intends to reduce the size of a camera by bringing the shutter top end located at the top position of the shutter opening near the shutter opening so as to bring the finder position near the opening, thereby achieving reduction of the camera. According to FIG. 3 indicating the fourth conventional example, a numerical value corresponding to the first conventional example is α=34° and if D=23 mm is assumed like the first conventional example, it comes that Δy=0.33 mm/deg. Therefore, deflection in the start position of the rear curtain slit forming blade is large, so that the second-basis time accuracy is difficult to maintain excellently. Further, because deflection in the rear curtain maximum charging angle (over-charge max) is large also, the lower edge position of the finder portion has to be determined by providing with an allowance considering this deflection, so that the height of the camera is increased just by the amount corresponding to this allowance.

Therefore, the second and third conventional examples are disadvantageous for high-speed traveling of the blade unit and for example, in case of a camera, a shorter exposure second-basis time than 1/4000 seconds or a shorter strobe synchronous second-basis time than 1/200 seconds is difficult to achieve. Further, because a shutter charging energy necessary for realizing the same curtain speed is increased, enlargement in size of the camera is induced or inconvenience occurs when the frame speed is increased for continuous photographing.

Also, according to the conventional examples, because the angle α is relatively small, deflection in the start position of the rear curtain slit forming blade is so large that it is difficult to maintain the second-basis time accuracy excellently. Additionally, because deflection in the rear curtain maximum charging angle (over-charge max) is large, the lower edge position of the finder portion has to be determined by providing with an allowance considering this, so that the height of the camera is raised just by the amount corresponding to this allowance.

SUMMARY OF THE INVENTION

Accordingly, an object of the present invention is to provide a short-arm type shutter device having a structure suitable for high-speed operation and securing an excellent operating efficiency, in which the size thereof in a direction (lateral direction) perpendicular to a blade traveling direction is reduced and the size thereof up to a shutter top end located at the top portion of a shutter opening is also reduced, while a sufficient blade overlapping amount for light shielding is secured and inertia of the blade unit is decreased.

To achieve the above-described object, according to an aspect of the present invention, there is provided a shutter device comprising: a shutter base plate having a shutter opening; a first arm member which rotates with a first shaft as a rotation center relative to the shutter base plate; a second arm member which rotates with a second shaft as a rotation center relative to the shutter base plate; and plural shutter blades, wherein each of the plural shutter blades is joined to the first and second members and when the first and second arm members rotate with respect to each shaft, the plural shutter blades travel over the shutter opening in a predetermined direction, and in a state in which the plural shutter blades are positioned in their overlapping state, when an angle formed between a line connecting the rotation center of the first arm with a connecting center to the first arm member of a shutter blade, located on a front end side (opposite side to the first rotation center) of the first arm member and a direction perpendicular to the predetermined direction is assumed to be α, a condition of $45° \leq \alpha \leq 50°$ is satisfied.

Preferably, when a dimension (length) from the rotation center of the first arm member to the connecting center of the shutter blade located on the front end side of the first arm member is assumed to be D and a dimension (length) of an opening of the shutter opening in the predetermined direction is assumed to be A, a condition of $0.78A \leq D \leq 0.90A$ is satisfied.

Further according to another aspect of the present invention, there is provided a shutter device comprising: a shutter base plate having a shutter opening; a first arm member which rotates with a first shaft as a rotation center relative to said shutter base plate; a second arm member which rotates with a second shaft as a rotation center relative to said shutter base plate; and plural shutter blades, wherein each of the plural shutter blades is joined to said first and second members and when said first and second arm members rotate with respect to each shaft, said plural shutter blades travel over said shutter opening in a predetermined direction, and when a distance from a connecting center to the said first arm member of a shutter blade located at a front end side (opposite side to said first rotation center) of the first arm member to an end portion of the shutter blade near said connecting portion is assumed to be H and the width of the shutter blade in said predetermined direction is assumed to be W, a condition of $0.3W \leq H \leq 0.4W$ is satisfied.

According to still another aspect of the present invention, there is provided a shutter device comprising: a shutter base plate having a shutter opening; a first arm member which rotates with a first shaft as a rotation center relative to said shutter base plate; a second arm member which rotates with a second shaft as a rotation center relative to said shutter base plate; and plural shutter blades, wherein each of the plural shutter blades is joined to said first and second arm members and when said first and second arm members rotate with respect to each shaft, said plural shutter blades travel over said shutter opening in a predetermined direction, and when a distance from a connecting center to said first arm member of a shutter blade located adjacent a shutter blade joined to the front end side (opposite side to said first rotation center) of the first arm member to an end portion of the adjacent shutter blade near the connecting center is assumed to be $H_2$ and the width of the adjacent shutter blade in said predetermined direction is assumed to be $W_2$, a condition of $0.26W_2 \leq H_2 \leq 0.34W_2$ is satisfied.

According to a further aspect of the present invention, a shutter device comprising: a shutter base plate having a shutter opening; a first arm member which rotates with a first shaft as a rotation center relative to said shutter base plate; a second arm member which rotates with a second shaft as a rotation center relative to said shutter base plate; and four shutter blades, wherein each of the four shutter blades is joined to said first and second arm members and when said first and second arm members rotate with respect to each shaft, each of said shutter blades travels over said shutter opening in a predetermined direction, and of respective connecting portions in said first arm member, a brim portion protruded from an arm face at the connecting portion located at a second shortest distance from said rotation center of said first arm does not invade into said opening during an operation of opening/closing said opening of said shutter blade.

Preferably, the brim portion is disposed nearer the base plate than the face of the first arm.

The above-described features will be made apparent from following drawings and a description thereof.

BRIEF DESCRIPTION OF THE DRAWINGS

FIG. 16 is a front view showing a closing state of the shutter device according to the second embodiment;

FIG. 24 is a view showing a blade movable end (over-charge max) of the conventional focal plane shutter (first conventional example).

BRIEF DESCRIPTION OF THE PREFERRED EMBODIMENTS (First Embodiment)

Figure 1:
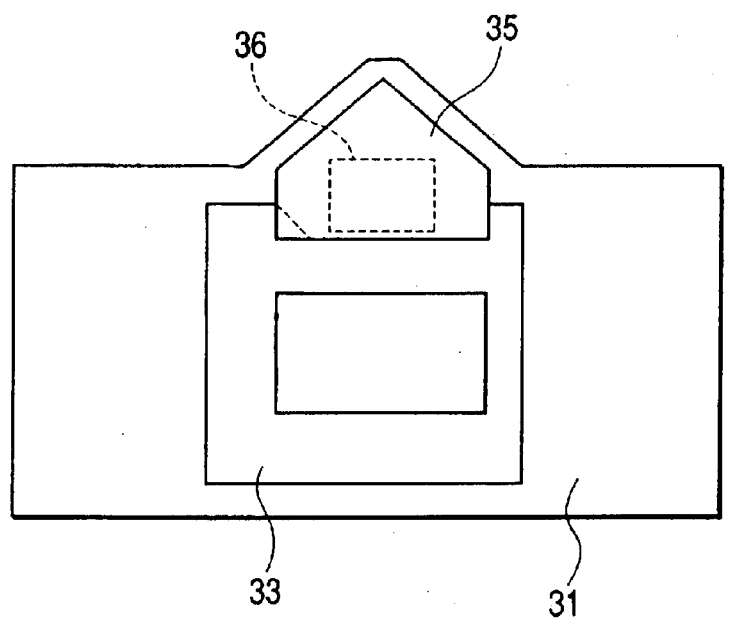
FIG. 1 is a front view of a single lens reflex camera loaded with a focal plane shutter device according to a first embodiment of the present invention.
Figure 2:
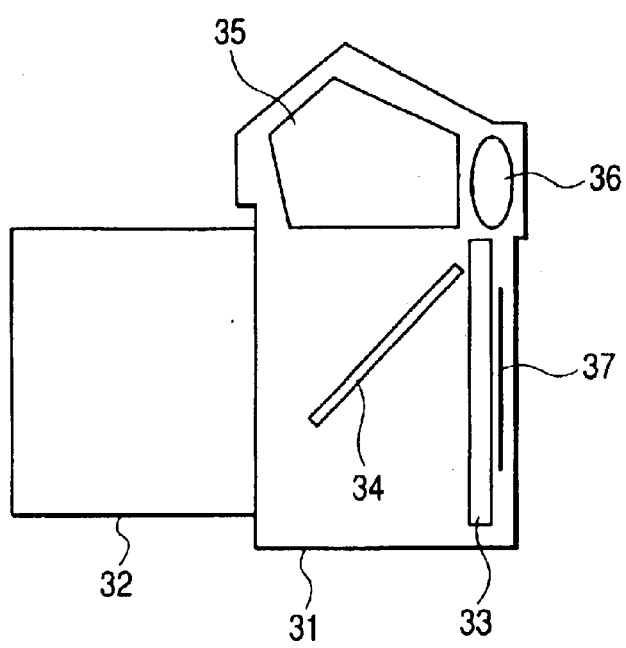
FIG. 2 is a side view of the aforementioned single lens reflex camera.
Figure 3:
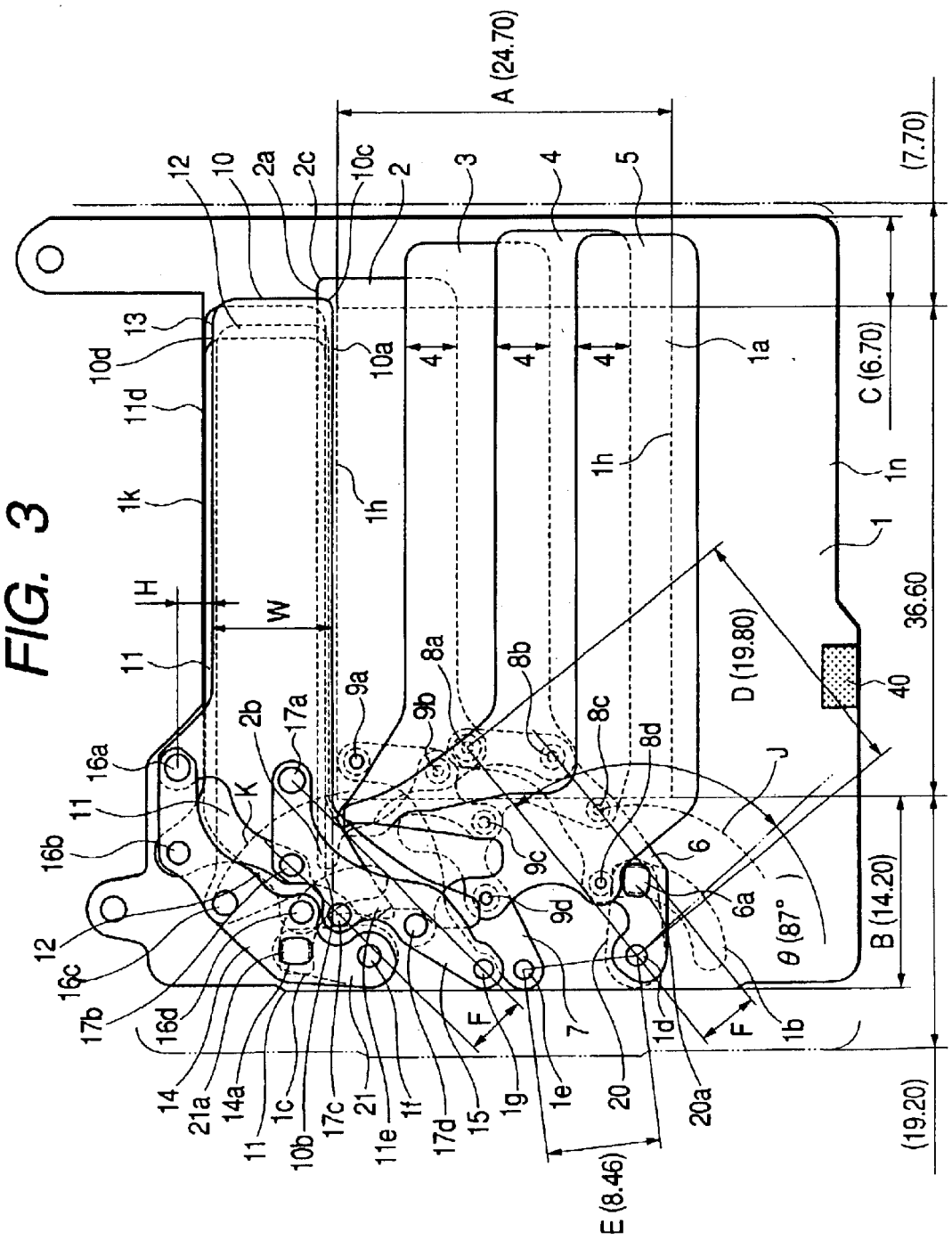
FIG. 3 is a front view of the focal plane shutter when a blade group thereof is set in a traveling preparation completion state.
Figure 4:
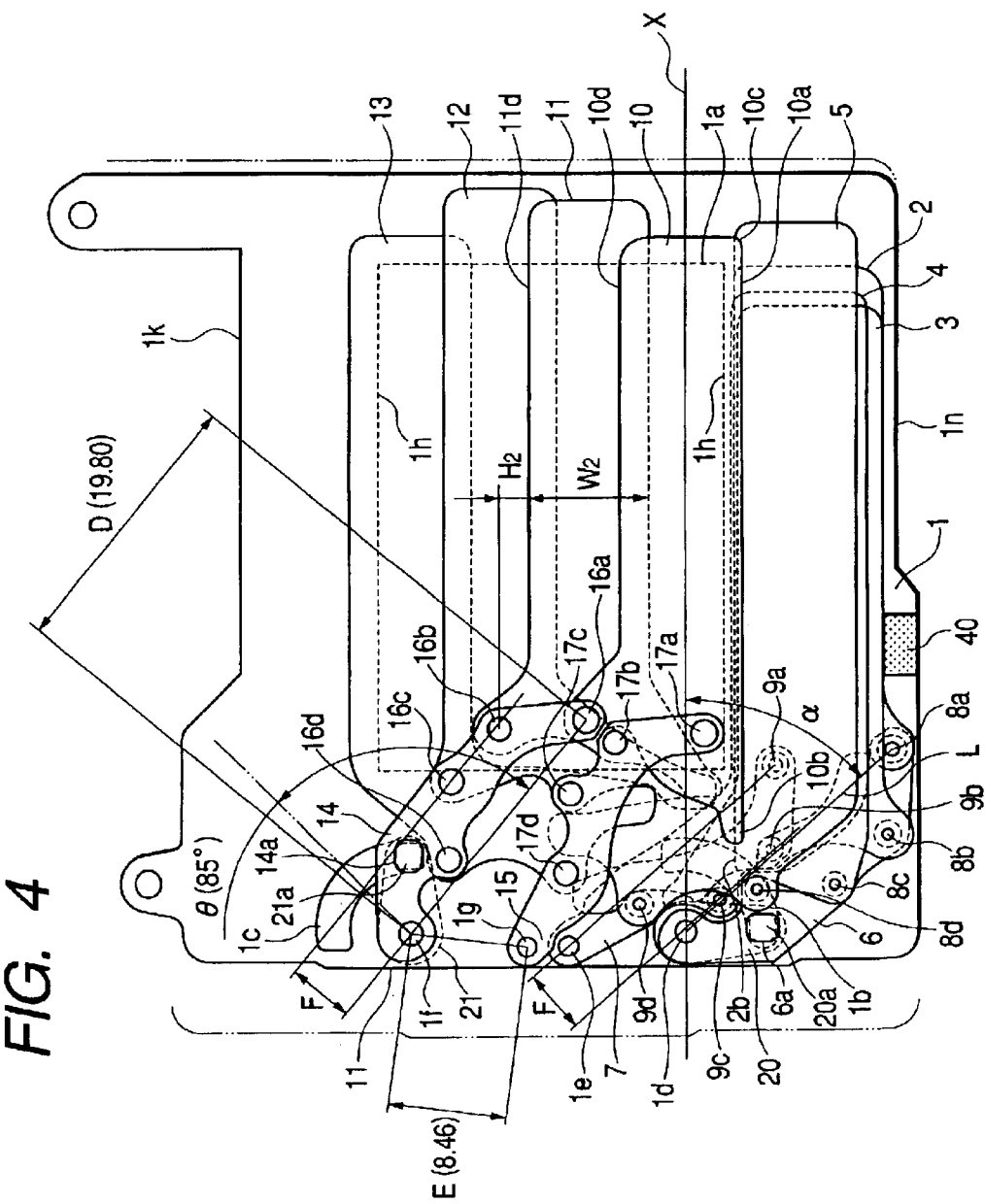
FIG. 4 is a front view of the focal plane shutter when the blade group thereof is set in a traveling completion state.

FIGS. 1 to 7 show the structure of a single lens reflex camera and focal plane shutter loaded thereon according to a first embodiment of the present invention. FIG. 1 is a front view of the aforementioned camera and the shutter device and FIG. 2 is a side view thereof. FIGS. 3 to 7 are views showing a shutter blade unit of the shutter device. FIG. 3 shows a traveling preparation completion state and FIG. 4 shows a traveling completion state. FIG. 5A is a front view showing a state of a movable end (overcharge max.) of the blade unit while FIG. 5B is a side sectional view thereof.

Figure 6:
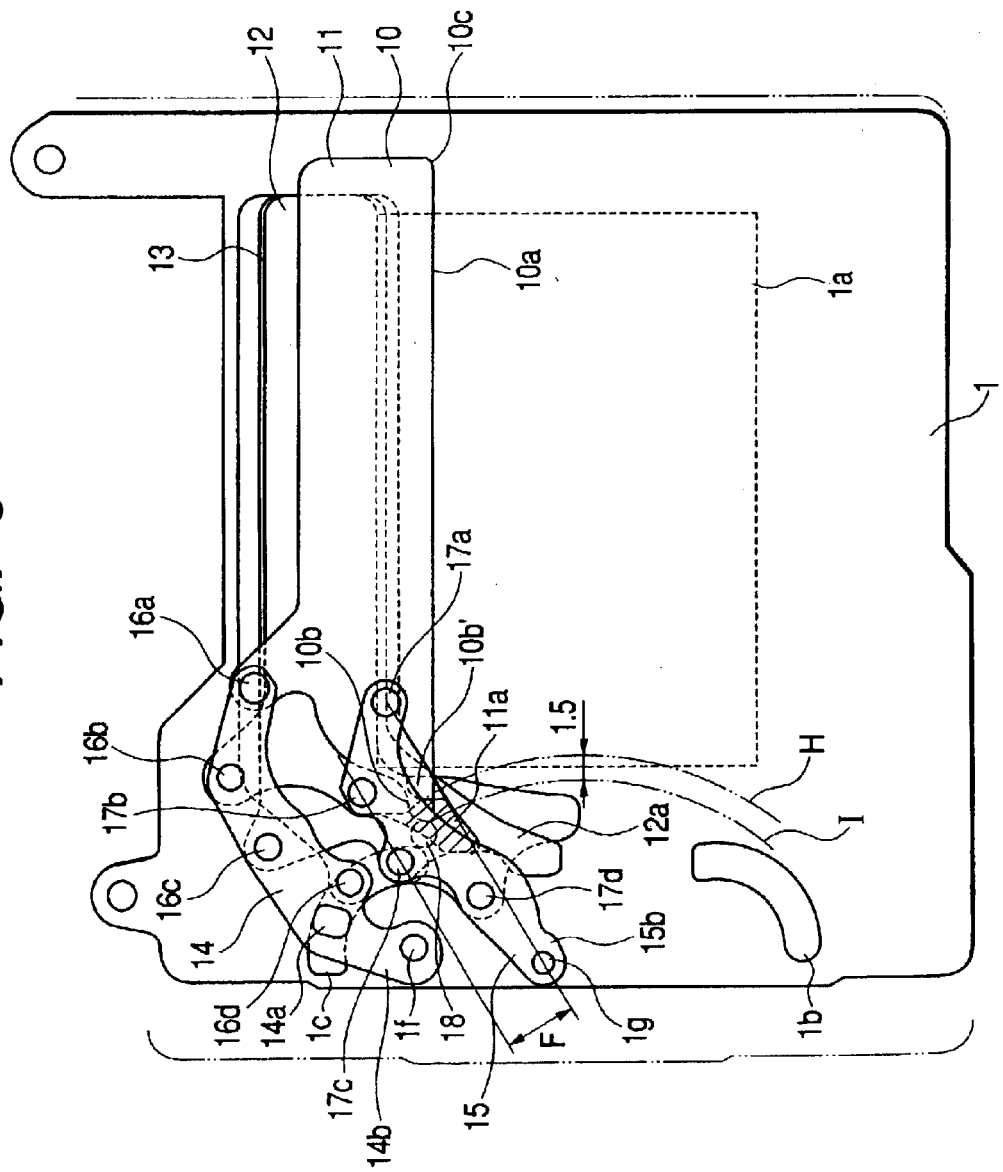
FIG. 6 is an explanatory view of an effect obtained by devising a blade caulking position to the arm of the focal plane shutter device.
Figure 7:
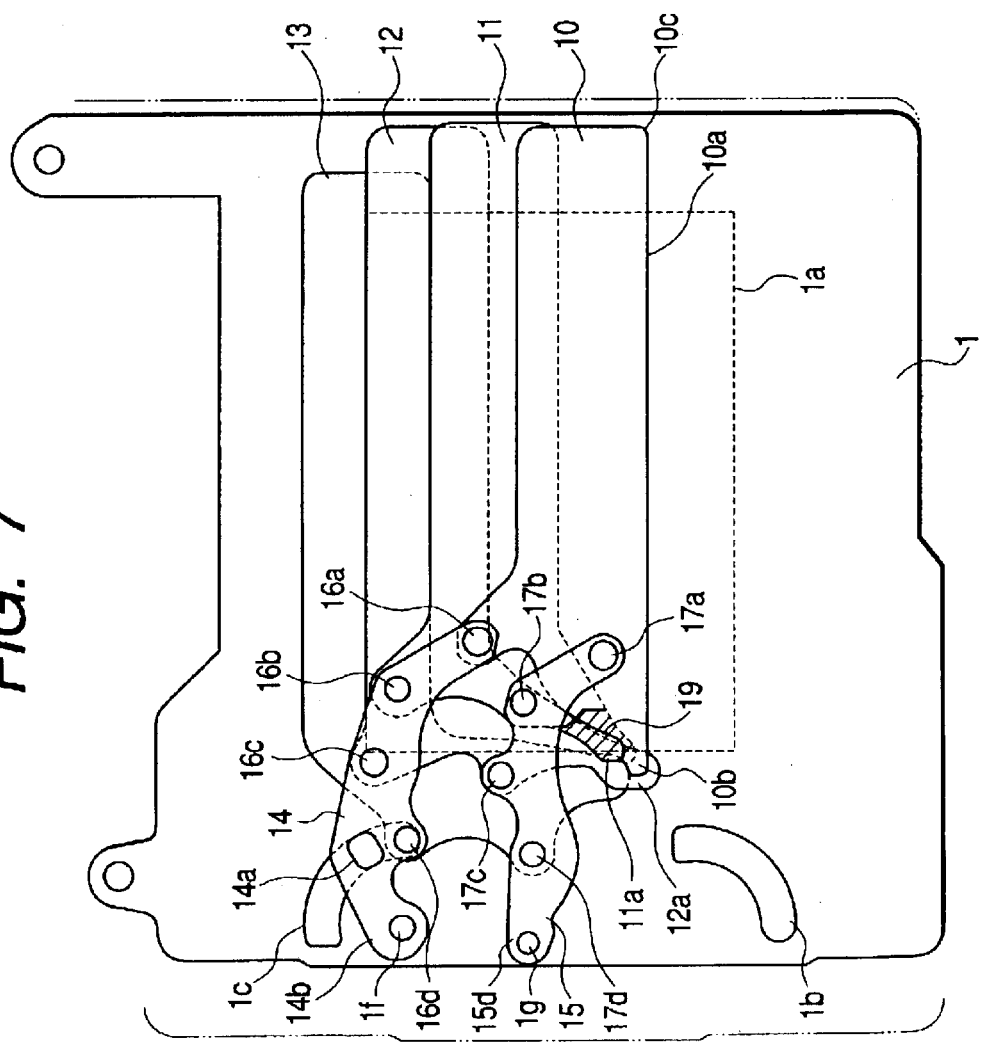
FIG. 7 is an explanatory view of an effect obtained by devising the blade caulking position to the arm of the focal plane shutter device.

FIGS. 6 and 7 are explanatory views for the effect of devising a blade holding position at an arm.

Referring to FIGS. 1 and 2, reference numeral 31 denotes a body of a single lens reflex camera, reference numeral 32 denotes a photographing lens, and reference numeral 33 denotes a focal plane shutter device. A reflection mirror (main mirror) 34 is disposed in front of the shutter device 33 and a finder section comprising a pentagon prism 35 and a finder eyepiece section 36 is disposed above the same mirror while a film 37 (image pickup device such as CCD in case of a digital camera) is disposed in the rear thereof.

Referring to FIGS. 3 to 7, reference numeral 1 denotes a base plate (hereinafter referred to as shutter base plate) having a shutter opening 1*a*. Reference numeral 1*b* denotes a long circular hole formed in the bottom portion of the left side of the shutter base plate 1 relative to the shutter opening 1*a* for a driving pin (joining section with a front curtain first arm 6, which will be described later) 20*a* formed on a front curtain driving lever 20, which will be described later, to recess in its movable region, and reference numeral 1*c* denotes a long circular hole formed in the upper portion of the left side of the shutter base plate 1 for a driving pin (joining section with a rear curtain first arm 14, which will be described later) 21*a* of a rear curtain driving lever 21, which will be described later, to recess in its movable region.

Reference numeral 20 denotes the front curtain driving lever, which is used to apply traveling energy by spring force or the like to the front curtain. Reference numeral 21 denotes the rear curtain driving lever, which is used to apply traveling energy by spring force or the like to the rear curtain.

Reference numeral 2 denotes a front curtain slit forming blade (light-shielding blade), reference numeral 2*a* denotes a slit forming edge of the front curtain slit forming blade 2 and reference numeral 2*b* denotes an end portion on the arm proximal end side of the slit forming edge.

Reference numerals 3 to 5 denote front curtain covering blades (light-shielding blade) and a blade 3 is referred to as front curtain second blade, and a blade 4 is referred to as front curtain third blade and a blade 5 is referred to as front curtain fourth blade. Reference numeral 6 denotes the front curtain first arm and its proximal end 6*b* is mounted rotatably around the shaft 1*d* provided in the shutter base plate 1 and supports the front curtain slit forming blade 2 rotatably relative to the front curtain first arm 6 through a caulking dowel 8*a* provided on its front end.

Reference numeral 6*a* denotes a hole portion which allows the driving pin 20*a* of the front curtain driving lever 20 to pass through without any clearance in the driving direction and the front curtain first arm 6 is supplied with a driving force from the front curtain driving lever 20 whose rotation shaft is provided coaxially with the shaft 1*d* through a coupling between this hole portion 6*a* and the driving pin 20*a*.

Reference numeral 7 denotes the front curtain second arm, whose proximal end 7*b* is mounted rotatably around the shaft 1*e* provided in the shutter base plate 1 and supports the front curtain slit forming blade 2 rotatably relative to the front curtain second arm 7 through a caulking dowel 9*a* provided in its front end.

In this way, a parallel link is formed with the front curtain slit forming blade 2 and the front first and second arms 6, 7.

Likewise, the front curtain second blade 3, front curtain third blade 4, front curtain fourth blade 5 of the front curtain covering blades are supported rotatably by intermediate portions of the front curtain first arm 6 and second arm 7 through respective caulking dowels 8*b* and 9*b*, 8*c* and 9*c*, 8*d* and 9*d*, so as to form parallel links.

The front curtain driving lever 20 is rotated with a shaft extended from the shaft 1*d* as its rotation shaft. A rotation radius of the driving pin 20*a* around the shaft 1*d* is set smaller than the rotation radius of the caulking dowel 8*d* for the front curtain fourth blade 5 located most inward on the first arm 6. In the above-described way, the front curtain unit is constructed. Reference numeral 40, as shown in FIG. 4, is a front curtain stopper rubber which receives the front curtain unit after it travels to the traveling completion state (overlapping state) elastically so as to block its bound.

In the traveling preparation completion state shown in FIG. 3, the end portion 2*b* on the side of the arm proximal end on the slit forming edge 2*a* of the front curtain slit forming blade 2 is located out of an operating region of the driving pin 21*a* to avoid an interference with the driving pin 21*a* in the rear curtain driving lever 21. In the traveling completion state shown in FIG. 4, the end portion 2*b* on the arm proximal end side is located within an operating region of the driving pin 20*a* of the front curtain driving lever 20.

On the other hand, the rear curtain unit is constructed in the same way as the front curtain unit. Reference numeral 10 denotes a rear curtain slit forming blade (light-shielding blade) and reference numeral 10*a* denotes a rear curtain slit forming edge while reference numeral 10*b* denotes an end portion on the side of an arm proximal end of the rear curtain slit forming edge 10*a*. Reference numerals 11 to 13 denote rear curtain covering blades (light-shielding blades) and reference numeral 11 denotes a rear curtain second blade, reference numeral 12 denotes a rear curtain third blade and reference numeral 13 denotes a rear curtain fourth blade.

Reference numeral 14 denotes a rear curtain first arm and its proximal end 14*b* is mounted rotatably around the shaft 1*f* provided in the shutter base plate 1 and the rear curtain slit forming blade 10 is supported rotatably relative to the rear curtain first arm 14 through a caulking dowel 16*a* provided in a front end thereof. Reference numeral 14*a* denotes a hole portion which allows the driving pin 21*a* of the rear curtain driving lever 21 to pass through without any clearance in the driving direction. The rear curtain first arm 14 is supplied with a driving force from the rear curtain driving lever 21 whose rotation shaft is provided coaxially with the shaft 1*f* through a coupling between this hole portion 14*a* and the driving pin 21*a*.

Reference numeral 15 denotes the rear curtain second arm and a proximal end 15*b* thereof is mounted rotatably around the shaft 1*g* provided in the shutter base plate 1 and supports the rear curtain slit forming blade 10 rotatably relative to the arm 15 through a caulking dowel 17 provided in a front end thereof.

In this way, a parallel link is constructed of the rear curtain slit forming blade 10 and the rear curtain first and second arms 14, 15.

Likewise, the rear curtain second blade 11, the rear curtain third blade 12 and the rear curtain fourth blade 13 of the rear curtain covering blades are supported rotatably by intermediate portions of the rear curtain first arm 14 and the rear curtain second arm 15 through caulking dowels 16*b* and 17*b*, 16*c* and 17*c*, 16*d* and 17*d* so that parallel links are constructed.

In the meantime, the rear curtain driving lever 21 is rotated with a shaft extended from the shaft 1*f* as its rotation shaft. The swivel radius of the driving pin 21*a* around the shaft 1*f* is set smaller than the swivel radius of the caulking dowel 16*d* for the rear curtain fourth blade 13 located most inward on the rear curtain first arm 14. In the above-described manner, the rear curtain unit is constructed.

In the traveling preparation completion state shown in FIG. 3, the end portion 10*b* on the side of the arm proximal end of the slit forming edge 10a of the rear curtain slit forming blade 10 is located within an operating region of the driving pin 21a of the rear curtain driving lever 21. In the traveling completion state shown in FIG. 4, the end portion 10b on the side of the arm proximal end is located out of the operating region of the driving pin 20a to avoid an interference with the driving pin 20a of the front curtain driving lever 20.

Figure 5A:
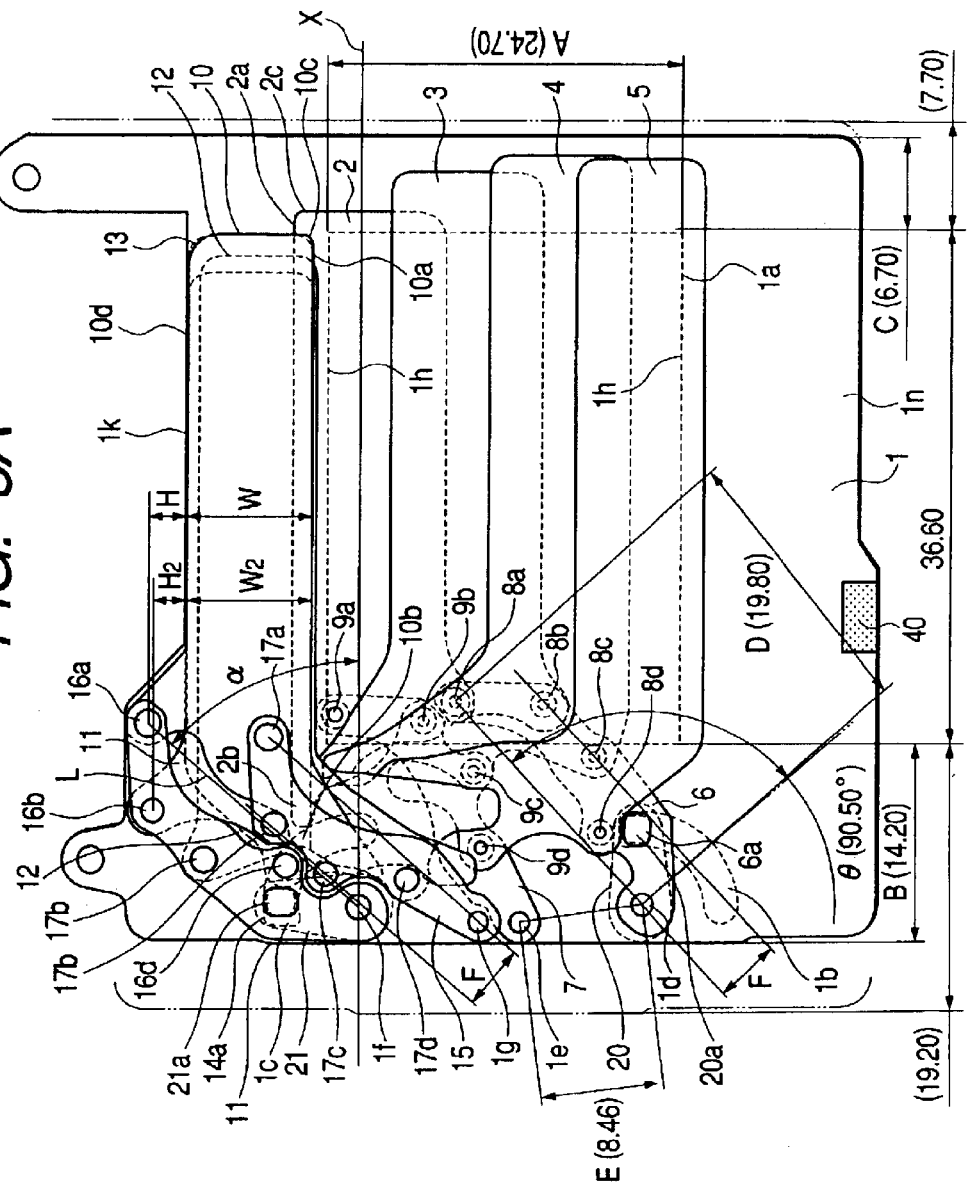
FIG. 5A is a view showing a state of a movable end (over-charge max) of a blade unit of the focal plane shutter device.

At a movable end (over-charge max.) in the rear curtain overlapping state shown in FIG. 5A, L indicates a line connecting a rotation center of the proximal end of the rear curtain first arm 14 with a rotation center of the caulking dowel 16a (rear curtain slit forming blade 10) provided in a front end of the same arm 14. X indicates a line running parallel to a face of the shutter opening 1a and through the rotation center of the proximal end of the rear curtain first arm 14 and extended in a direction (horizontal direction) perpendicular to the running direction (vertical direction) of the rear curtain. α indicates an angle formed between L and X.

Likewise, at a movable end (traveling completion state) in the front curtain overlapping state shown in FIG. 4, L indicates a line connecting a rotation center of the proximal end of the front curtain first arm 6 with a rotation center of the caulking dowel 8a (front curtain slit forming blade 2) provided in a front end of the same arm 6. X indicates a line running in parallel to the face of the shutter opening 1a and through the rotation center of the proximal end of the front curtain first arm 6 and extended in a direction (horizontal direction) perpendicular to the traveling direction (vertical direction) of the front curtain. α indicates an angle formed between L and X.

Further, on the rear curtain, a distance between the rotation center (that is, rotation coupling center of the rear curtain slit forming blade 10) of the caulking dowel 16a, which is a linking member for linking the rear curtain slit forming blade 10 connected to the front end of the rear curtain first arm 14 with the rear curtain first arm 14 and an end face in the vertical direction (bottom end face) near the rotation center of the caulking dowel 16a in the rear curtain slit forming blade 10 is assumed to be H while the width of the rear curtain slit forming blade 10 in the vertical direction is assumed to be W.

Furthermore, on the rear curtain, a distance between the rotation center of the caulking dowel 16b which is a linking member for linking the rear curtain second blade 11 adjacent the rear curtain slit forming blade 10 connected to the front end of the rear curtain first arm 14 with the rear curtain first arm 14 and an end face in the vertical direction 11d near the rotation center of the caulking dowel 16b in the rear curtain second blade 11 is assumed to be $H_2$ while the width of the rear curtain second blade 11 in the vertical direction is assumed to be $W_2$.

In these front curtain and rear curtain units, the arm length is short for reduction of the size (so-called short-arm type). If the arm length is short in the parallel link, because the vertical dimension of the shutter opening 1a is constant, the arm rotation angle needs to be increased to move the blade by a predetermined distance.

If like a first conventional example (FIGS. 22 to 24), caulking dowels 117b, 117c, 117d in the second arm 115 are so disposed that they may contact the proximal end 114b and caulking dowels 116c, 116d in the first arm 114 in the overlapping state of blade unit having 4-blade structure when the arm rotation angle is increased, as described above, the arm rotation angle cannot be increased, so that reduction of the shutter size is impossible.

Therefore, to increase the arm rotation angle, it is effective to dispose the caulking dowels 9b, 9c, 9d and 17b, 17c, 17d in the second arms 7, 15 and the proximal ends 6b, 14b and the caulking dowels 8d, 16d in the first arms 6, 14 so that they protrude and retreat alternately as shown in FIGS. 3 to 5A and 5B. Further, if the caulking dowels 8c, 9c, 8d, 9d and 16c, 17c, 16d, 17d in at least two blades (third blade, fourth blade) 4, 5 and 12, 13 disposed on a side near the arm proximal end can be disposed near a side end portion 11 of the external shape of the shutter base plate 1 and along the side end portion 11, the effect of the reduction in size is great.

In the rear curtain according to the first conventional example, which is a specific example, the arm rotation angle cannot be increased and in the blade overlapping state, caulking dowels 116c, 117c, 116d, 117d of two blades 112, 113 disposed on a side near the arm proximal end cannot come near the side end portion 101 of the shutter base plate nor along the side end portion 1011. As a result, a distance in the lateral direction between the caulking dowels 116c and 116d (117c and 117d) is as large as 3.08 mm, so that the dimension (lateral dimension) in a direction perpendicular to the blade traveling direction of shutter is kept large. Thus, even if reduction in the size of a shutter is tried with the same arrangement relation of caulking dowels as the first conventional example, it can be expected easily that the size cannot be reduced so much.

On the other hand, according to this embodiment, because the front curtain and the rear curtain are so disposed that their caulking dowels protrude or retreat alternately, the arm rotation angle can be increased largely and caulking dowels 8c, 9c, 8d, 9d and 16c, 17c, 16d, 17d in two blades (third blade, fourth blade) 4, 5 and 12, 13 disposed near the arm proximal end are located near the side end portion 11 of the external shape of the shutter base plate 1 and further along the side end portion 11. Thus, a distance in the lateral direction between the caulking dowels 8c and 8d (9c and 9d) of the front curtain is 0.44 mm while a distance in the lateral direction between the caulking dowels 16c and 16d (17c and 17d) of the rear curtain is 0.77 mm. Further, if 4° at most is considered as an angle corresponding to the over-charge, these distances in the lateral direction of the front curtain and the rear curtain in the overlapping state can be set to substantially 0 (zero). Therefore, an effect upon the reduction in size in the direction perpendicular to the blade traveling direction (lateral direction) of the shutter is great.

According to this embodiment, a dot-chain arc J shown in FIG. 3 indicates a motion trajectory of an external periphery of the brim of the caulking dowel 8c. Of joint members on the arm 6 of the front curtain first arm 1, all the brims 8c–a protruded from the face of the arm 6 of the caulking dowel 8c are protected from entering into the shutter openings 1a, 22a when the front blade group opens or closes the shutter openings 1a, 22a. Here, part of the brims 8c–a enters the shutter openings 1a, 22a.

Figure 5B:
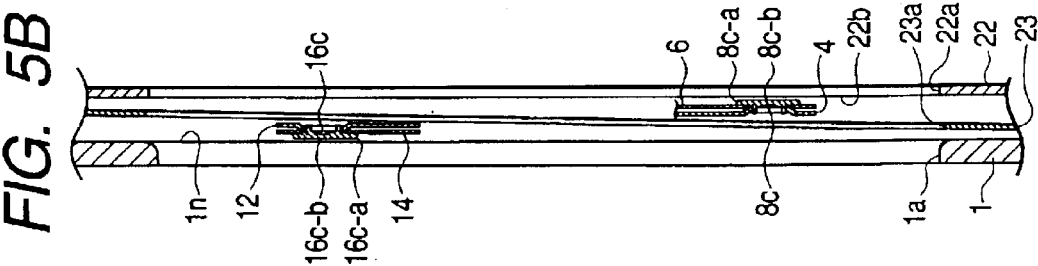
FIG. 5B is a side sectional view of respective components shown in FIG. 5A.

As for a relation among the caulking dowel 8c, the shutter base plate 1 and the cover plate 22 along optical axis, faces 8c–b of the brims 8c–a of caulking dowels for the third blade 4 always faces a face 22b of the cover plate with a slight gap so as to block the front curtain from deflecting relative to the optical axis during traveling of the front curtain (see FIGS. 5A and 5B). A dot chain line arc K of FIG. 3 indicates a motion trajectory of the outer periphery of a brim of the caulking dowel 16c. Of connecting members on the first arm 14 for the rear curtain, connecting members at a second shortest distance from the proximal portion 14b of the first arm 14, that is, all the brims 16c–a protruded from a face of the arm 14 of the caulking dowel 16c for the third rear curtain 12 are blocked from invading into the shutter openings 1a, 22a when the rear curtain group operates for opening/closing the shutter openings 1a, 22a. Here, part of the brim 16c–a invades into the shutter opening 1a, 22a.

As for the relation among the caulking dowel 16c, the shutter base plate 1 and the cover plate 22 along the optical axis, the face 16c–b of the brim 16c–a of the caulking dowel for the third rear curtain 12 always faces a face 1n of the shutter base plate with a slight gap so as to block the rear curtain from deflecting relative to the optical axis during traveling of the rear curtain.

Next, the operation of the above-described shutter device will be described. In the traveling preparation completion state shown in FIG. 3, the front curtain driving lever 20 and the rear curtain driving lever 21 are attracted and held by a second-basis time control magnet (not shown). At this time, if attraction failure of the second-basis time control magnet occurs so that the rear curtain is not held at its traveling preparation position and only the rear curtain travels to close the shutter opening 1a, the end portion 2b on the arm proximal end side of the slit forming portion 10a of the front curtain slit forming blade 10 is located out of the operating region of the driving pin 21a so as to avoid an interference with the driving pin 21a of the rear curtain driving lever 21.

Although the end portion 10b on the arm proximal end side of the rear curtain is located within the operating region of the driving pin 21a, it moves out of the operating region of the driving pin 21a with an expansion action for closing the shutter opening 1a of the rear curtain, so that the end portion 10b never interferes with the driving pin 21a of the rear curtain driving lever 21.

If attraction of the second-basis time control magnet for the front curtain is released by a shutter release signal, the front curtain rotates the front curtain first arm 6 and second arm 7 in clockwise direction by a force of a front curtain driving spring (not shown) which generates a rotation force in clockwise direction in the front curtain driving lever 20. Accompanied by this, the front curtain slit forming blade 2 and the front curtain covering blades (second blade 3, third blade 4, fourth blade 5) are moved by the action of the parallel links from up of the shutter opening 1a to down with the front curtain slit forming edge 2a, front curtain second blade 3, third blade 4 and fourth blade 5 kept in parallel to the long side 1h of the shutter opening 1a so as to open the shutter opening 1a. In this way, the front curtain travels to a position shown in FIG. 4 so as to open the shutter opening 1a.

After attraction of the second-basis time control magnet for the front curtain is released and a predetermined time similar to a set exposure second-basis time elapses, attraction of the second-basis time control magnet for the rear curtain is released, so that the rear curtain rotates the rear curtain first arm 14 and second arm 15 in clockwise direction by a force of a rear curtain driving spring (not shown), which generates a rotation force in clockwise direction in the rear curtain driving lever 21. Accompanied by this, the rear curtain slit forming blade 10 and the second blade 11, the third blade 12 and the fourth blade 13 of the rear curtain covering blades are moved by an action of the parallel links from up of the shutter opening 1a to down with the rear curtain slit forming edge 10a, the second blade 11, the third 12 and the fourth blade 13 kept in parallel to the long side 1h of the shutter opening 1a so as to close the shutter opening 1a. In this way, the rear curtain travels to a position shown in FIG. 4 so as to close the shutter opening 1a and then, exposure is ended.

Upon shutter charging, the charging mechanism (not shown) is actuated so as to rotate the front curtain and rear curtain driving levers 20, 21 in counterclockwise direction without opening the shutter opening 1a by advancing the front curtain in an action reverse to the exposure action, so that the front curtain/rear curtain are moved from the state shown in FIG. 4 to the position shown in FIG. 3 through the over-charging max state shown in FIGS. 5A and 5B. Consequently, the front curtain driving lever 20 and the rear curtain driving lever 21 are attracted by a second-basis time control magnet (not shown) and held thereby.

In the traveling completion state of FIG. 4, upon the shutter charging, when the front curtain moves first to close the shutter opening 1a, the end portion 10b on the side of the arm proximal end of the slit forming edge 10a of the rear curtain slit forming blade 10 is located out of the operating region of the driving pin 20a to avoid an interference with the driving pin 20a of the front curtain driving lever 20. Further, although the end portion 2b on the side of the arm proximal end of the slit forming edge 10a of the front curtain slit forming blade 2 is located within the operating region of the driving pin 20a, it is moved out of the operating region of the driving pin 20a with the expanding action of the front curtain for closing the shutter opening 1a, the same end portion 2b never interferes with the driving pin 20a of the front curtain driving lever 20.

If the focal plane shutter device of this embodiment is mounted on a single-lens reflex camera using a 135-format silver salt film, the vertical dimension A of the shutter opening 1a is 24.7 mm while the horizontal dimension thereof is 36.6 mm. Because the size of the shutter opening 1a in this format is fixed, if it is intended to decrease the size of the shutter device, the size of composition around the shutter opening 1a is decreased.

Here, the dimension between the end face on the arm proximal end side (left side in FIG. 3) of the shutter opening 1a and an end face on a side for supporting the arm proximal end (left side in FIG. 3) of the shutter base plate 1 is assumed to be B and the dimension between an end face on the blade front end side (right side in FIG. 3) of the shutter opening 1a and an end face of the shutter base plate 1 on the blade front end side is assumed to be C. Further, a dimension between the rotation center of the arm proximal end and the rotation center of a caulking dowel for supporting the slit forming blade located at the arm front end is assumed to be D. The maximum rotation angle of the arm proximal end around the rotation center is assumed to be θ. A dimension between the first arm and the second arm of the parallel link formed by the first arm and the second arm is assumed to be E. Points which should be noticed about reduction of these dimensions will be described below.

Figure 22:
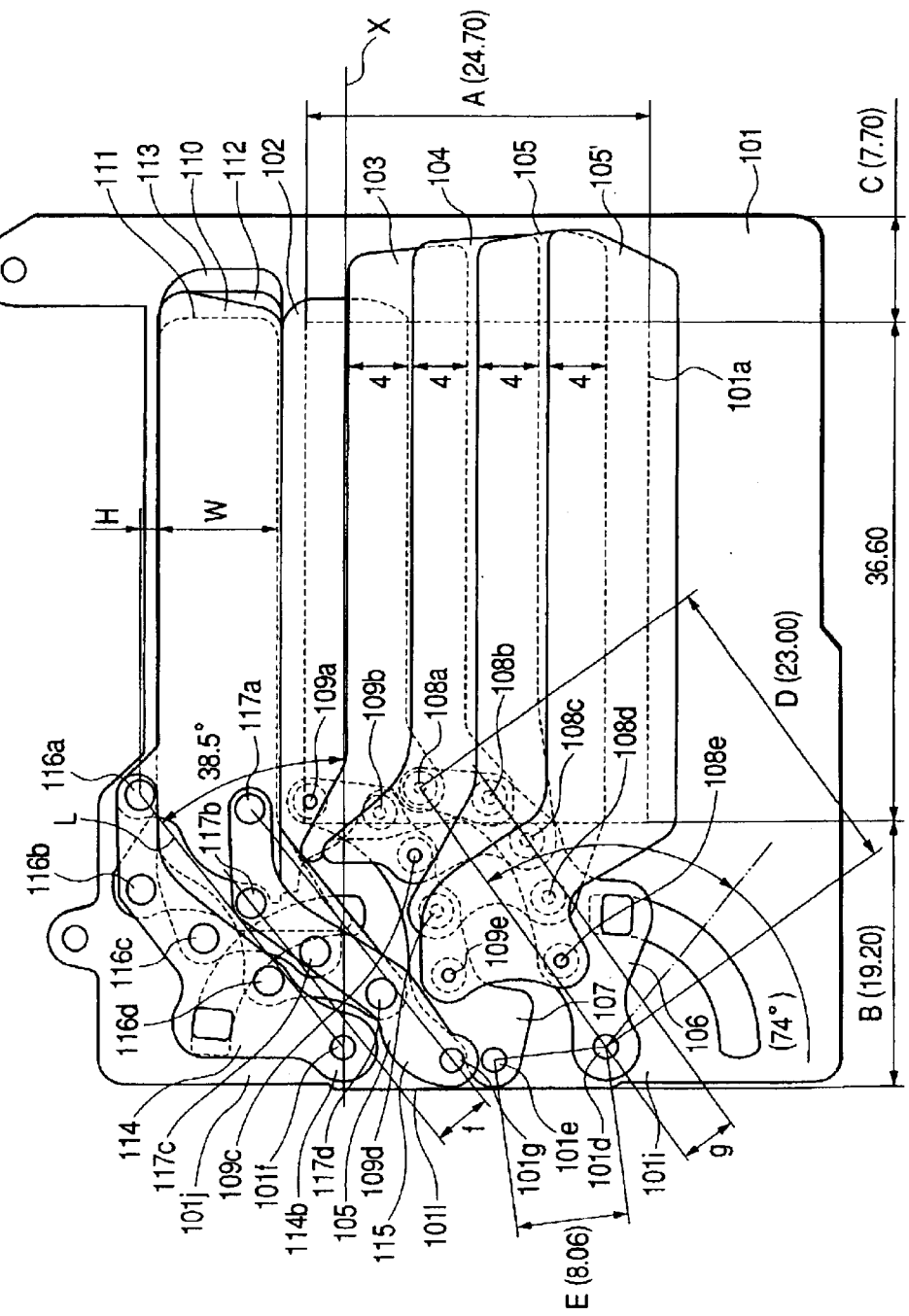
FIG. 22 is a front view showing a traveling preparation completion state of a conventional focal plane shutter (first conventional example)

(1) Number of Blades Supported Rotatably by the Arm:

Although this embodiment adopts 4-blade structure for both its front curtain and rear curtain, in a case where five blades are supported by a single arm like the front curtain of the first conventional example, when a camera is in its film winding charge completion state (a recent motor incorporated camera stands by for a next photographing with this condition), the width of a blade of the 5-blade structure can be smaller than that of the 4-blade structure under a condition for assuring a predetermined overlapping amount (such amount are 4 mm as shown in FIG. 3 of the present invention and 4 mm as shown in FIG. 22 of the conventional example) of blades necessary for shielding from light when the front curtain closes the shutter opening by expanding its blades. Thus, as the number of blades is increased, the shutter can be folded to a smaller size in its blade storage condition when the shutter opening is opened, so that the vertical dimension corresponding to a blade traveling direction of the shutter is decreased.

The number of blade supporting positions increases as the number of blades increases and consequently, the arm length increases. Thus, the dimension of the shutter in the horizontal direction perpendicular to the blade traveling direction is increased. If extending of the arm length is avoided as far as possible (corresponding to the first conventional example), an allowable portion on the arm is decreased because the number of the blade supporting positions is increased. Thus, the dimension of the shutter in its horizontal direction is difficult to decrease further. Additionally, the number of overlapping portions of the blades in the 5-blade structure is larger by one than that of the 4-blade structure and its total blade area is larger. Because the number of blade supporting positions is increased by one additionally, inertia of the entire blade unit is increased, which is disadvantageous for high-speed traveling.

On the other hand, in case of the 3-blade structure, the number of the blade supporting positions is decreased and is allowable portion on the arm is increased, which is advantageous for decreasing the dimension of the shutter in the horizontal direction. However, the shutter cannot be folded to a smaller size when the shutter opening is opened under a condition for assuring the predetermined overlapping amount (for example, 4 mm) when the shutter opening is closed by expanding the blades. Therefore, the dimension of the shutter in the vertical direction corresponding to the blade traveling direction of the shutter is increased. If it is intended to decrease the dimension thereof in the vertical direction, the overlapping amount between adjacent blades when the blades are expanded is decreased, so that light shielding performance is lost. In conclusion, if the shutter is constituted of three blades, a balance in the dimension between the vertical and horizontal directions is bad, and it is difficult to mount such a shutter device on a camera.

Actually, the 4-blade structure of this embodiment is optimum for both the front curtain and the rear curtain to secure an overlapping amount of blades which can realize a sufficient light shielding performance and an excellent balance in ratio between the vertical and horizontal dimensions of the shutter and reduce the horizontal dimension effectively.

(2) Arm Length (Dimension from the Rotation Center of the Arm Proximal End to the Rotation Center of a Caulking Dowel for Supporting the Slit Forming Blade at the Arm Front End):

The present invention aims at a minimum length which supports the 4-blade structure blades freely rotatably and allows the slit forming blades 2, 10 to travel over the vertical dimension A of the shutter opening 1a with a sufficient allowance.

(3) Arm Maximum Operating Angle θ Around the Rotation Center of the Arm Proximal End:

If the arm length D is decreased in the above (2), naturally, the angle θ has to be increased for the traveling distance of the slit forming blades 2, 10 to clear the vertical dimension A of the shutter opening 1a.

(4) Dimension E Between the First Arm and the Second Arm:

If the arm maximum rotation angle θ is increased, if the dimension between the arms is the same as conventionally, an interference occurs between the first and second arms, particularly an interference occurs between the blade joint portions at the times of blade expansion and storage (overlapping), no sufficient operating angle can be secured.

If the arm maximum rotation angle θ is increased, the blade joint portions of the slit forming blades 2, 10 and the blade front end side on opposite side enter into the shutter opening 1a deep when a state near the blade expansion or blade storage (overlapping) is provided. If this happens, engagement looseness in the blade joint portion is magnified at position far from the joint portion, so that parallelism of the slit forming blades 2, 10 (slit forming portions 2a, 10a) is worsened.

To solve these two solutions, the dimension E between the first arm and the second arm is increased. Further, by enlarging a span between arms formed by the parallel link, stability in parallelism during operation of the slit forming blades supported by the arms is improved because of the characteristic of the parallel link.

(5) Dimension C from an End Face on the Blade Front: End Side of the Shutter Opening 1a to an End Face of the Shutter Base Plate 1 on the Blade Front End Side If the arm maximum rotation angle θ is increased by shortening the arm length D, the amount of deflection in a direction perpendicular to the traveling direction of the blades due to opening/closing action is increased, which is disadvantageous for decreasing the dimension C.

However, by providing the slit forming edge just up to a blade front end by reducing the corner radius R (2c, 10c) to its minimum extent of the slit forming edge on the front end side of the slit forming blade so as to shorten the length of the slit forming blade extremely or simplifying the shape of the front end of each blade to a linear shape along the end face of the shutter base plate, an overlapping amount between the front end of each blade and the shutter base plate 1 around the shutter opening 1a or a cover plate at the time of blade expansion is set substantially equal to the conventional example in order to secure an excellent light shielding performance and prevent the blades from being made loose by user's pressing carelessly with his finger, thereby the dimension C being reduced.

(6) Arrangement of the Blade Joint Portions (Caulking Dowel) on the Arm:

FIGS. 6 and 7 are explanatory views about an effect of the arrangement of the blade joint portions on the arm. FIG. 6 is an explanatory view for the slit forming blades 2, 10 and FIG. 7 is an explanatory view for the light shielding portion. Both the figures are plan views indicating a state in which the shutter is traveling. Only the rear curtain will be described because the front curtain and the rear curtain have the same structure.

Referring to the same Figures, reference numeral 10b denotes an end portion on the arm proximal end side of the slit forming edge 10a of the rear curtain slit forming blade 10, reference numeral 18 (indicated by two-dot line) denotes a caulking dowel in the rear curtain third blade 12 disposed in the same way as conventionally. Reference numeral 11a denotes an arm side light-shielding piece of the rear curtain second blade 11 and reference numeral 12a denotes an arm side light-shielding piece of the rear curtain third blade 12.

Figure 23:
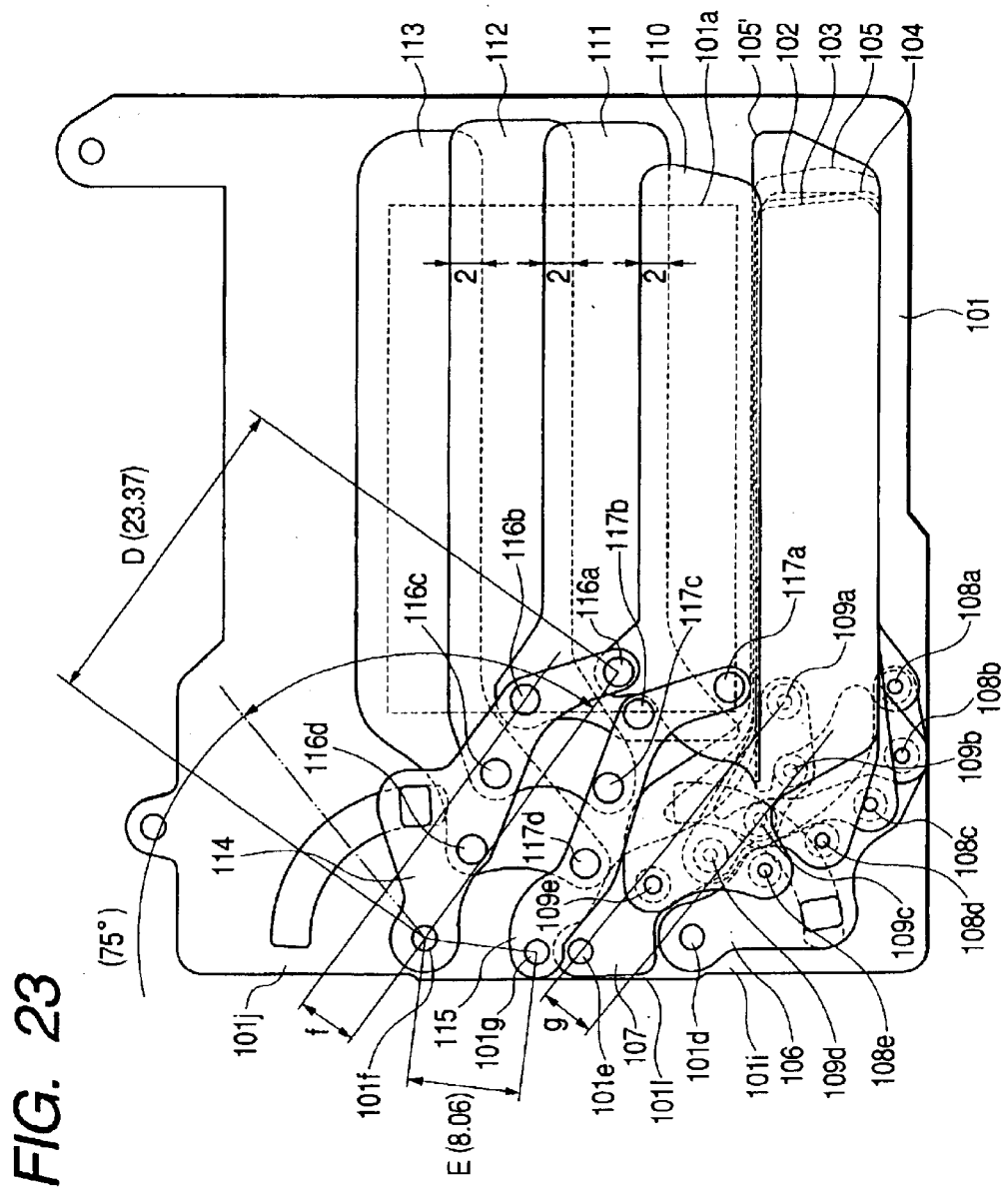
FIG. 23 is a front view showing a traveling completion state of the conventional focal plane shutter (first conventional example)

As for the arrangement of the blade joint portions (caulking dowels) on the conventional arm, as shown in FIGS. 22 and 23, if looking at a distance from a line connecting the rotation center of the arm proximal end (101f, 101g) with the rotation center of the joint portion (116a, 117a) of the slit forming blade at the arm front end on the rear curtain having four-blade structure, the rotation center of the joint portion (116b, 117b) of the second blade of rotation centers of the blade joint portions is the farthest (the distance is indicated with f in the same figure), followed by that of the third blade and that of the fourth blade.

On the other hand, if looking at a distance from a line connecting the rotation center (101d, 101e) of the arm proximal end with the rotation center of the joint portion (108a, 109a) of the slit forming blade at the arm front end, the rotation center of the joint portion (108c, 109c) of the third blade of the rotation centers of the blade joint portions is the farthest (the distance is indicated by g in the same figure), followed by those of the second blade, the fourth blade and the fifth blade in order.

Because the four-blade structure is optimal for both the front curtain and the rear curtain in order to reduce the lateral dimension of the shutter effectively as described before, if the blade joint portions are disposed on arms like conventionally under the 4-blade structure, the arrangement of the caulking dowel 18 for the third blade is indicates with two-dot line of FIG. 6.

Because in this case, the end portion 10b on the arm proximal end side of the slit forming edge 10a of the slit forming blade 10 interferes with the caulking dowel 18 for the third blade, the end portion 10b on the arm proximal end side has to be moved toward the blade front end side by about 1.5 mm as indicated by 10b'.

Consequently, the motion trajectory of the most external shape of an end portion 10b' of the arm proximal end side is indicated by H so that it enters the shutter opening 1a, thereby slit formation as a shutter being disabled.

To avoid this, the front end of the slit forming blade 10 needs to be extended by 1.5 mm so that the entire blade unit is moved by 1.5 mm to the arm proximal end (left direction in the same figure) relative to the shutter opening 1a.

Because the arm side light-shielding piece 11a of the second blade 11 interfere with the caulking dowel 18 for the third blade, the light-shielding piece 11a needs to be allowed to escape. If the light-shielding piece 11a is removed as indicated by a shaded portion in the same figure, a portion 19 which cannot shield from light (gap formed between the slit forming blade 10 and the arm side light-shielding piece 12a of the third blade 12) during the operation of the blade unit is generated, so that shutter function is made invalid.

This cannot be achieved only by enlarging the lateral dimension of the shutter by about 1.5 mm with respect to this embodiment and consequently, the lateral dimension can be reduced only slightly with respect to the first conventional example.

In contrast, as for the arrangement of the blade joint portions (caulking dowels) on the arm of this embodiment, if looking at a distance from a line connecting the rotation center (1f, 1g) of the arm proximal end with the rotation center of the joint portion (16a, 17a) of the slit forming blade at the arm front end, the rotation center of the joint portion (16c, 17c) of the third blade of the rotation centers of the blade joint portions is the farthest (the distance is indicated by F in the same figure) followed by those of the second blade and the fourth blade.

As a result of such an arrangement, an interference between the end portion 10b on the arm proximal end side of the slit forming edge 10a on the slit forming blade 10 and the caulking dowel 17c for the third blade is eliminated, so that the motion trajectory of the most external shape of the end portion 10b on the arm proximal end side never enter into the shutter opening 1a as indicated by I.

Further, the arm side light-shielding piece 11a of the second blade 11 can form the arm side light-shielding piece 11a sufficiently without interfering with the caulking dowel 17c for the third blade, so that light-shielding can be performed securely.

Consequently, in the shutter device of this embodiment, its lateral dimension can be reduced by 6 mm relative to the first conventional example.

(7) An Angle α Between a Line Connecting the Rotation Center of the Proximal End of the First Arm with the Rotation Center of the Caulking Dowel at the Front End on the Same Arm and a Direction (Horizontal Direction) Perpendicular to the Blade Traveling Direction Parallel to a Face of the Shutter Opening 1a in Blade Overlapping State in Which the Blades are Located at Arm Movable End:

Because the amount by which the slit forming blade travels in a traveling direction per unit angle can be decreased as α is nearer 90°, an influence of disparity of a holding angle at a start position of the first arm 14 or disparity of an overcharge position of the first arm 14 upon the position of the slit forming blade 10 can be reduced in the rear curtain. On the other hand, in the front curtain, the disparity of the blade position at the traveling completion state can be reduced.

(8) A Distance H Between the Rotation Center of a Joint Portion Provided on the First Arm for Connecting the Slit Forming Blade to the Front End of the First Arm and an End Face Substantially Perpendicular to the Blade Traveling Direction on a Side Near the Rotation Center of a Joint Member on the Slit Forming Blade:

To enlarge the angle α under a state in which the first arm 14 is located at the movable end with rear curtain overlapping, the first arm 14 is accommodated in a region having a space in a camera's finder eyepiece optical system.

Further, H is preferred to be as large as possible in order to reduce the height of a camera for reduction of the size by reducing the dimension up to a shutter top end 1k located at the top of the shutter opening 1a as much as possible to lower a low edge position of the finder eyepiece optical system.

Next, the dimensions of respective components will be reviewed.

First, the dimension B is 19.2 mm in the first conventional example shown in FIGS. 22 and 23, which can be reduced by about 1 mm by reducing the diameter of a blade caulking dowel or an allowance between blade members during and after traveling. If the dimension B is reduced further, the arm side end portion of the slit forming edge on the slit forming blade enters a shutter opening. Consequently, a rectangular slit, which is to be formed by the front curtain, rear curtain slit forming blades and the shutter opening, is not formed so that the shutter function is not achieved. Thus, to reduce the dimension B by 2 mm or more, technique of the present invention is necessary.

A shutter near an optimum balance achieved by reduction of the size according to the present invention is the first embodiment and the dimension B is 14.2 mm. Material of the rotation shaft 1d, 1e, 1f, 1g of the arm proximal end is changed from plastic formed integrally with the shutter base plate to a metal such as stainless and its shaft diameter is changed from 1.6 mm to 1.0 mm. Accompanied by this, a radius of the external periphery of the proximal portion of each arm of the front curtain and rear curtain is reduced by 0.3 mm. Consequently, the end face of the shutter base plate 1 on the left side of FIG. 3 can be shifted to the right.

If according to the first conventional example, it is assumed that reduction by 2 mm is an upper limit for the dimension B while reduction by 0.3 mm is a lower limit for the dimension B, the following relation expression is established.

$$\{(14.2-0.3)/24.7\}A \leq B \leq \{(19.2-2)24.7\}A \therefore 0.56A \leq B \leq 0.70A \quad (1)$$

The dimension B can be selected freely within a range specified by the above described expression (1) according to technique of the present invention.

Next, the dimension C is 7.7 mm in the first conventional example shown in FIGS. 22 and 23 and while its lowest limit that makes reduction of the size felt is 0.3 mm, its upper limit is 7.4 mm. Because the dimension C is automatically determined by the trajectory of a front end of the slit forming blade, if as shown in the above (5), the arm length D is shortened and the arm maximum rotation angle θ is increased as described in the present invention, the amount of deflection of a blade group in a direction perpendicular to the traveling direction (particularly, slit forming blade) is increased, which is disadvantageous for reduction of the dimension C.

However, in the shutter device of the first embodiment near the optimal balance which is miniaturized by the technique of the first embodiment, the dimension C can be set to 6.7 mm.

If the slit forming edge is provided up to an extreme limit of the blade end by minimizing the radius of a corner of the slit forming edge on a front end side of the slit forming blade in order to search for the limit of reduction of the size, the length of the front end of the slit forming blade can be reduced by 0.7 mm additionally.

If the front end of other blades than the slit forming blade is reduced by about 0.7 mm, the lower limit of the dimension C is 6.0 mm. If the size is made smaller than this value, the slit forming blade enters the interior of the shutter opening 1a during an operation of the blade group, thereby losing the shutter function. As regards the overlapping amount between the front end of each blade during expansion of the blades and the shutter base plate 1 around the shutter opening 1a or the cover plate, its minimum amount necessary for securing light shielding performance and preventing the blades from being made loose by careless pressing of user cannot be secured.

Therefore, the dimension C is expressed by the following relation expression.

$$(6.0/24.7)A \leq C \leq (7.4/24.7)A \therefore 0.24A \leq C \leq 0.30A \quad (2)$$

The dimension C can be selected freely within the scope thereof indicated by the above (2) according to the technique of the present invention.

Figure 8:
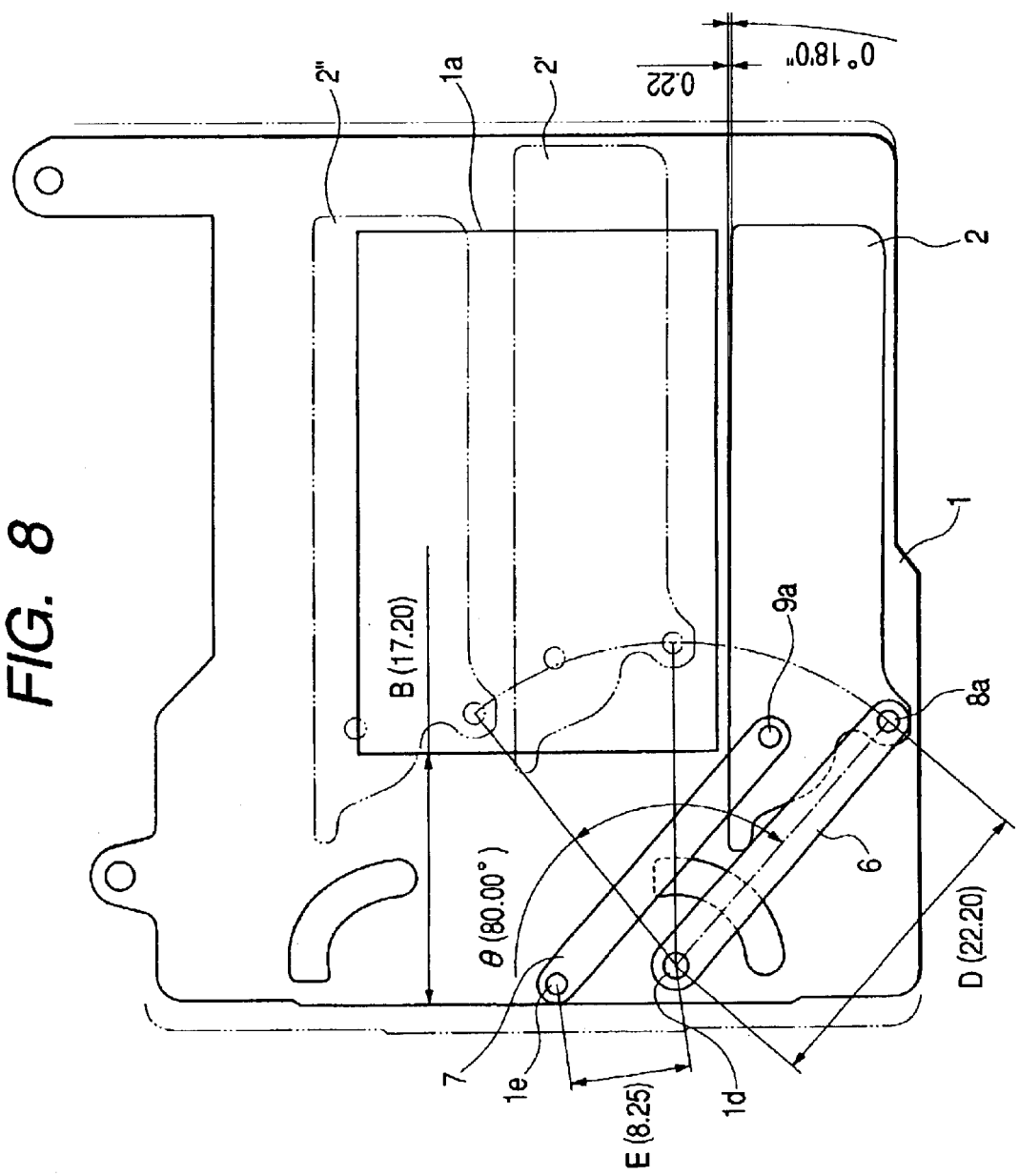
FIG. 8 is a front view of an example of the focal plane shutter device having the structure of the first embodiment, showing schematically the traveling completion state indicating a balance between a front curtain arm and a slit forming blade with respect to a shutter base plate dimension and an inclination of the slit forming portion.

Next, the dimension C according to the first conventional example of FIGS. 22 and 23 is 23.0 mm and if the technique of the present invention is adopted corresponding to reduction of the dimension B from 19.2 mm based on the first conventional example by 2 mm, the dimension D is changed from FIG. 8 to 22.2 mm. FIG. 8 is a view of traveling completion state showing schematically a balance of the front curtain arm and the slit forming blade with respect to the shutter base plate and an inclination of the slit forming portion.

2' indicated by two-dot chain line in the same figure shows a state in which the slit forming blade is moved to the front end side and 2" shows a state in which the slit forming blade is moved to the traveling preparation completion position. In the meantime, because the same thing can be said of the rear curtain, description thereof is omitted.

In the shutter device of the first embodiment near the optimal balance minimized according to the technique of the present invention, the dimension D is 19.8 mm and if the limit of miniaturization is searched for further, it can be reduced by 0.5 mm additionally, so that the size is 19.3 mm. For the purpose, the maximum rotation angle θ of the arm is increased and the recess amount is increased by narrowing the shapes of the first and second arms which interfere with each other if such a countermeasure is not taken, and the diameter of the caulking dowel in the blade is reduced and restriction condition of the shape of each blade such as the light-shielding piece near the arm is relaxed. Further, it is permissible to reduce the overlapping amount between the adjacent blades at the time of blade expansion to its minimum limit.

Figure 9:
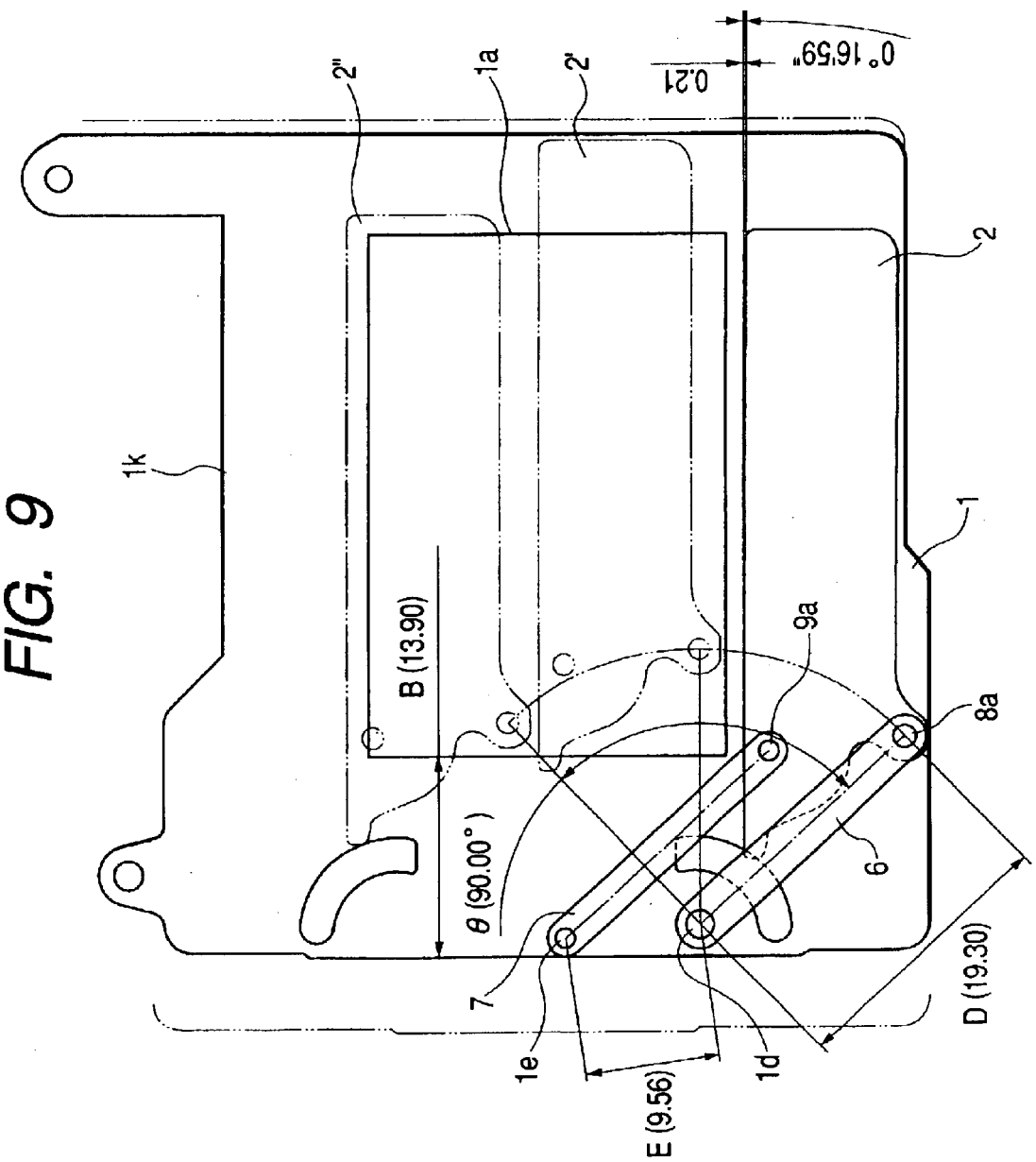
FIG. 9 is a front view of another example of the focal plane shutter device having the structure of the first embodiment, showing schematically the traveling completion state indicating a balance between a front curtain arm and a slit forming blade with respect to a shutter base plate dimension and an inclination of the slit forming portion.

FIG. 9 is a view of the traveling completion state showing a balance of the front curtain arm and slit forming blade with respect to the shutter base plate and an inclination of the slit forming edge. 2' indicated by two-dot chain line in the same figure shows a state in which the slit forming blade is moved to the front end while 2" shows a state in which the slit forming blade is moved to the traveling preparation completion position. In the meantime, because the same thing can be said of the front curtain, description thereof is omitted.

If the dimension D is reduced further, supporting of each blade becomes difficult in terms of space and further if the arm shape is narrowed or the diameter of the caulking dowel in the blade is reduced, arm strength and blade caulking strength are lowered too much, thereby leading to a rupture. Also, light shielding performance drops, so that the shutter function is lost.

Therefore, the dimension D can be expressed in the following relation expression.

$$(19.3/24.7)A \leq D (22.2/24.7)A \therefore 0.78A \leq D \leq 0.90A \quad (3)$$

The dimension D can be selected freely according to technique of the present invention with the scope of the dimension D specified by the above expression (3).

Next, as for the maximum rotation angle of the arm, according to the first conventional example shown in FIGS. 22 and 23, the arm rotation angle from the traveling completion state to the traveling preparation completion state is 74° to 75° and if the overcharge is set to 4° at maximum (the overcharge changes between 0° and 4° due to an adjustment roller of a charging mechanism (not shown) depending on each shutter), the total arm rotation angle is 79°.

If the technique of the present invention is applied corresponding to the dimension B of 17.2 mm and the dimension D of 22.2 mm, the lower limit of the arm maximum rotation angle θ is 80°+(overcharge 0° to 4°) as shown in FIG. 8.

In the shutter device of the first embodiment near the optimal balance miniaturized by the technique of the present invention, θ is 87°+(overcharge 0° to 4°) and if further limit of the miniaturization is searched for, the θ is 90°+(overcharge 0° to 4°) corresponding to the dimension D of 19.3 mm as shown in FIG. 9.

Therefore, the θ can be expressed in a following relation expression.

$$80° \leq \theta \leq 94° \quad (4)$$

The value θ can be selected freely according to technique of the present invention within the scope of the θ specified by the above expression (4).

If the value θ is increased in such a way, the positions (6a, 14a) for engaging the driving pins 20a, 21a of the front curtain driving lever 20 and the rear curtain driving lever 21, which provide the front curtain and rear curtain with a traveling energy through spring force or the like with the first arms 6, 14 are limited.

That is, because the front curtain and the rear curtain 20, 21 rotate coaxially with the rotation centers 1d, 1f of the first arms 6, 14, if the swivel radius of the driving pins 20a, 21a is increased, a region occupied by the operation trajectory of the driving pins 20a, 21a is expanded as the value θ is increased, so that the freedom of the blade arrangement is decreased, which is disadvantageous for reduction of the shutter size.

Therefore, the swivel radius of the driving pins 20a, 21a is demanded to be as small as possible. Further, preferably the position (20a in FIG. 4, 21a in FIG. 3) of each driving pin in the front curtain traveling completion state or front curtain charge completion state to the overcharge state is as near the shutter base plate 1 as possible.

Recent cameras have adopted a system of winding up a film using a friction force with a spool on which rubber is wound without using a sprocket for a film feeding mechanism and employed a photo-sensor instead of detecting a rotation amount of the sprocket to index a film curtain. Thus, a recess begging from some region is provided above and under at the left end of the shutter base plate 1 corresponding to the shape of the sprocket existing on the left side of the shutter across a wall of a camera body (not shown) (101i, 101j of FIGS. 22 and 23).

In the first embodiment of the present invention, attention is paid to it that no recess needs to be provided for this sprocket and the swivel radius of each of the driving pins 20a, 21a is minimized and further, the respective driving pins (20a in FIG. 4 and 21a in FIG. 3) in the traveling completion state of the front curtain or in the state of charge completion to overcharge of the rear curtain are brought near the left end of the shutter base plate, so that they are located just below for the front curtain and just above for the rear curtain, the rotation center 1d, 1f of the first arm 6, 14.

Further, the swivel radius of the driving pins 20a, 21a is made smaller than the swivel radius of the caulking dowel 8d, 16d for the fourth blade located most inside the first arm 6, 14, which is effective for reduction of the size of the shutter (in other words, the operating region of the driving pin is located nearer the proximal end rotation shaft of the first arm than the operating region of any blade caulking dowel on the first arm) and additionally, the end portion 2b on the arm proximal end side of the slit forming blade 2 of the front curtain enters the operating region of the driving pin 20a when the front curtain is overlapped, at a position where it never interferes with the driving pin 20a of the front curtain driving lever 20 (position where the driving pin 20a passes when the front curtain is expanded), thereby using a space effectively. In addition, when the rear curtain is overlapped as shown in FIG. 3, the end portion 10b on the arm proximal end side of the slit forming blade 10 enters the operating region of the driving pin 21a at a position where it never interfere with the driving pin 21a of the rear curtain driving lever 21 (position where the driving pin 21a passes when the rear curtain is expanded), thereby using a space effectively. These contribute to reduction of the size in a direction perpendicular to the blade traveling direction (horizontal direction).

Figure 12:
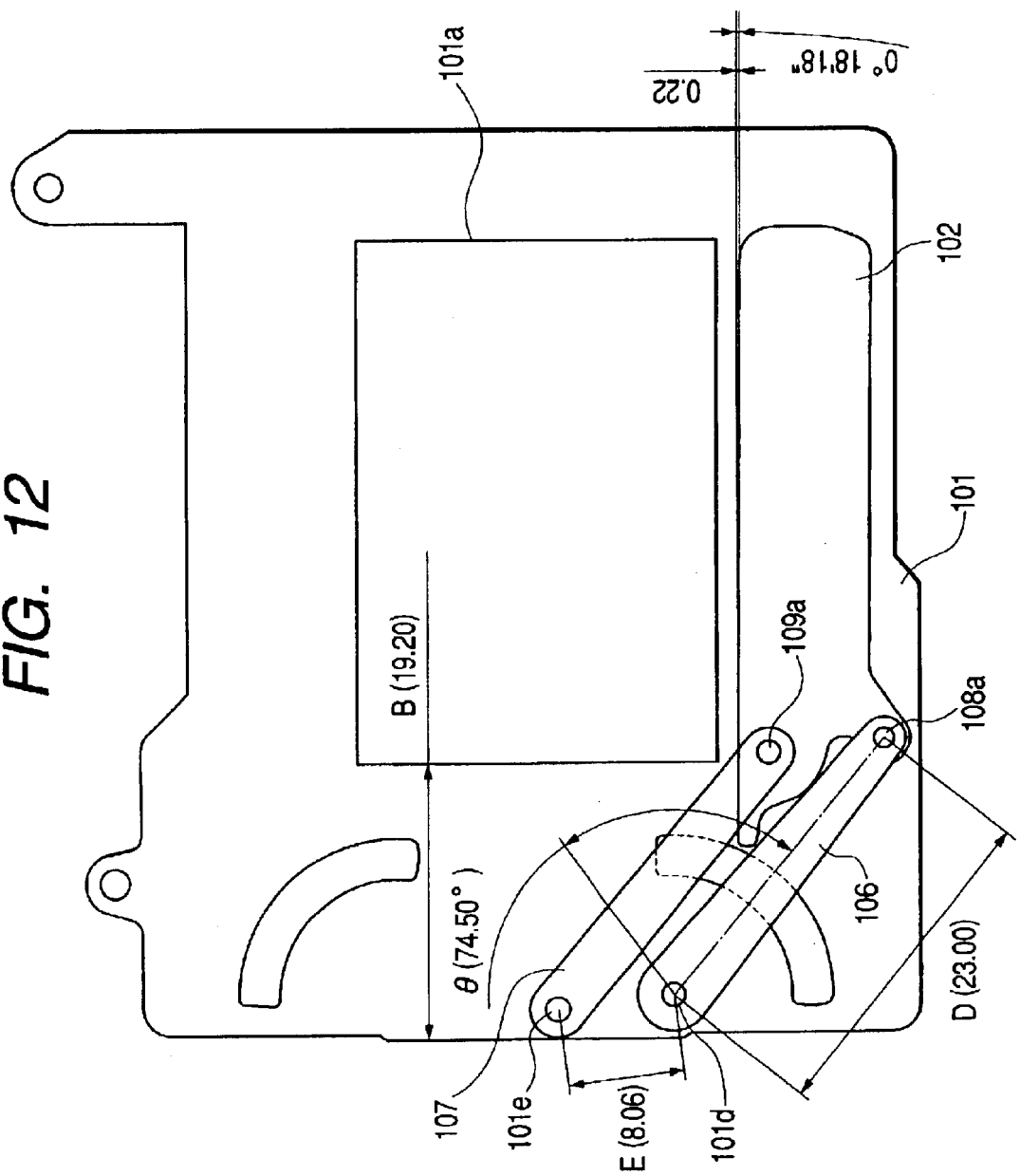
FIG. 12 is a front view of another example of the focal plane shutter device having the structure of the first embodiment, showing schematically the traveling completion state indicating a balance between the front curtain arm and the slit forming blade with respect to the shutter base plate dimension and an inclination of the slit forming portion.

Next, the dimension E is 8.06 mm in the first conventional example of FIGS. 22 and 23 and the parallelism of the slit forming edges 2a, 10a is expressed with an inclination angle of the slit forming edge and a distance in the blade traveling direction (vertical direction in the same figure) on both ends of the slit forming edge (linear portion). As a condition for that, it is assumed that there is no fitting looseness at the rotation shaft portion (101d, 101e and the like) of the arm proximal end and the fitting of the blade caulking dowel for supporting the slit forming blades on the arm is assumed to be grade H8 for the hole and grade f8 for the shaft and a maximum looseness relative to the diameter of 1.5 mm is assumed to be 34 μm. FIG. 12 shows its result. FIG. 12 is a view of the traveling completion state showing schematically a balance between the front curtain arm and slit forming blade with respect to the shutter base plate and an inclination of the slit forming edge. Because the same thing can be said of the rear curtain, description thereof is omitted.

Consequently, the inclination angle of the slit forming edge 2a is 0° 18' 18" and a distance in the blade traveling direction on both ends of the slit forming edge is 0.22 mm.

In order to maintain the inclination angle of the slit forming edge and the distance in the blade traveling direction on both ends of the slit forming edge not smaller than the same level as the conventional example under the same looseness condition using the technique of the present invention corresponding to the dimension B of 17.20 mm, the dimension D of 22.2 mm and the lower limit of the arm maximum rotation angle θ of 80°, the dimension E is 8.25 mm as shown in FIG. 8.

Figure 10:
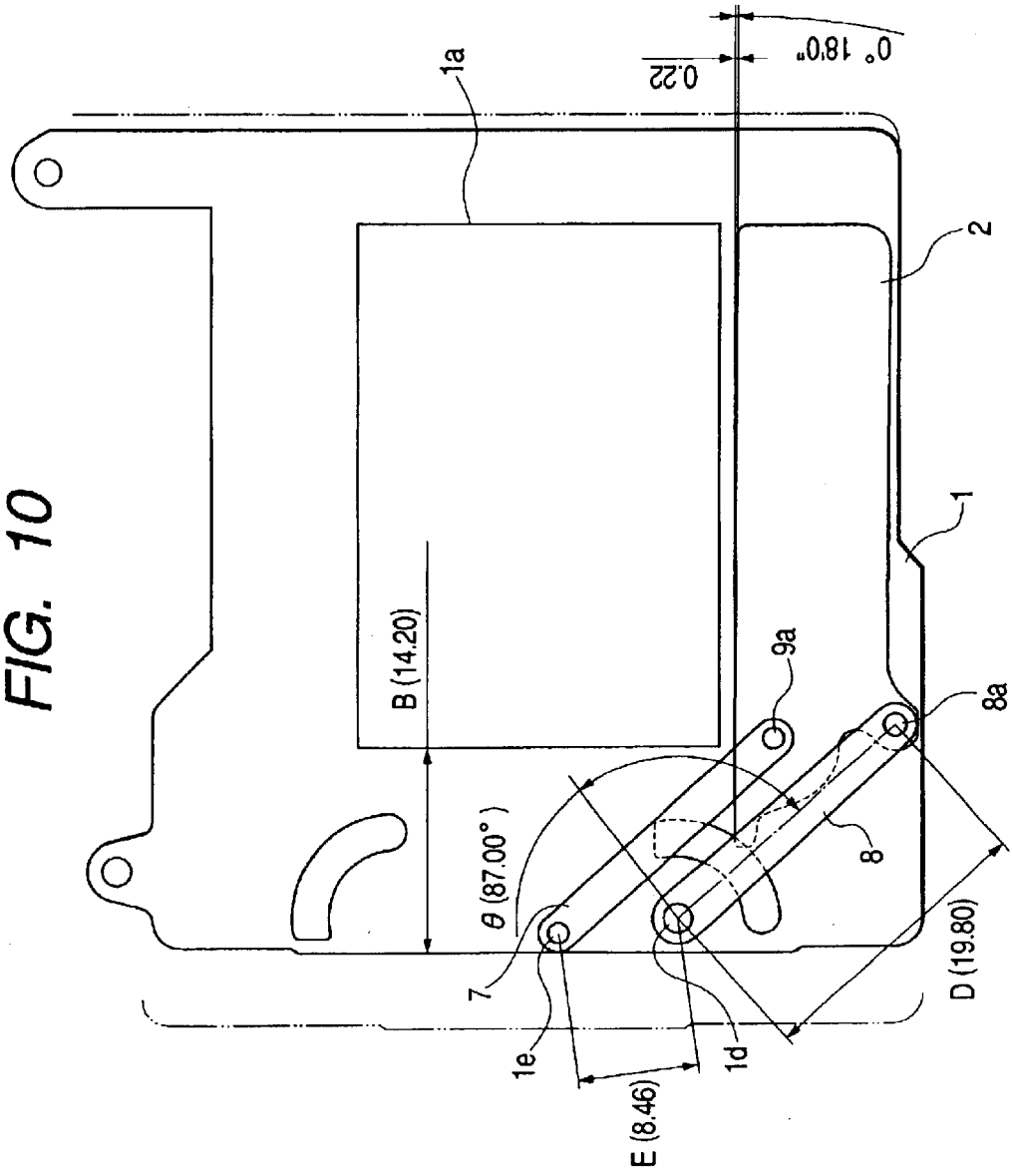
FIG. 10 is a front view of the traveling completion state indicating schematically a balance between the front curtain arm and the slit forming blade with respect to the shutter and an inclination of the slit forming portion in the focal plane shutter of the first embodiment.

In the shutter device of the first embodiment near the optimal balance miniaturized according to the technique of the present invention, the dimension E is 8.46 mm and, as shown in FIG. 10, which is a view of the traveling completion state showing schematically the inclination of a balance between the front curtain arm and slit forming blade with respect to the shutter base plate dimension of the first embodiment and an inclination of the slit forming portion, the inclination angle of the slit forming edge is 0° 18' 0" and a distance in the blade traveling direction on both ends of the slit forming edge is 0.22 mm under the same looseness condition as the conventional example. Consequently, the degree of restriction on the inclination of the slit forming edge is improved slightly as compared to the conventional example and the same thing can be said of the rear curtain.

Figure 11:
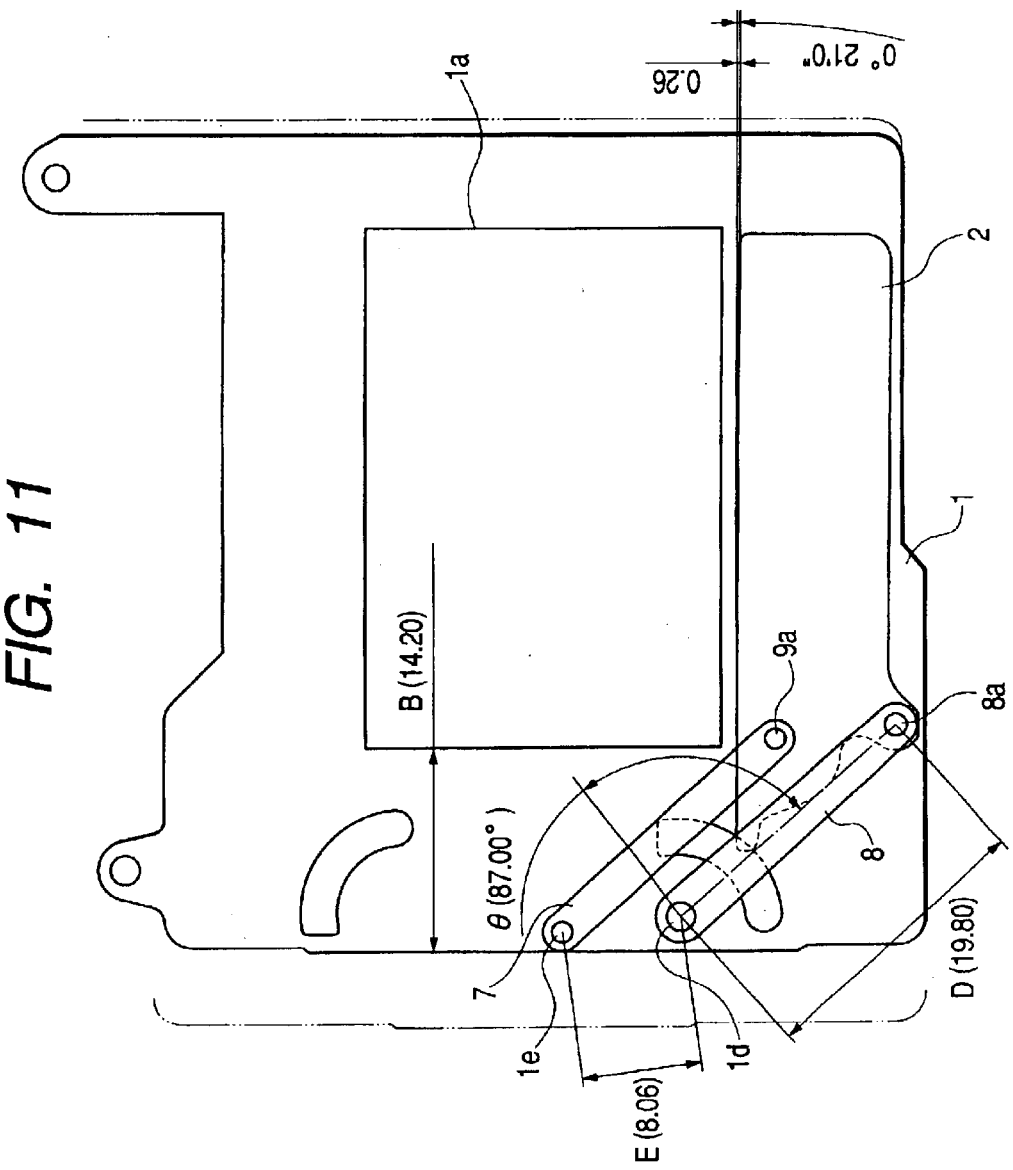
FIG. 11 is a view showing a case where only the dimension E in FIG. 10 is different.

If in the shutter device of the first embodiment, the dimension E is set to 8.06 mm like conventionally, the inclination angle of the slit forming edge is 0° 21' 0" and the distance in the blade traveling direction on both ends of the slit forming edge is 0.26 mm under the same looseness condition as the above-described conventional example as shown in FIG. 11 (view in which only the dimension E is different from FIG. 10) and therefore, the parallelism of the slit forming portion is worse than the conventional example. This means deterioration of the exposure unevenness on an exposure curtain.

From what has been described above, it is evident that the dimension E should be increased up to 8.46 mm to secure a better performance in the miniaturized shutter device of the first embodiment than conventionally.

To search for a limit of the miniaturization further, the technique of the present invention is employed corresponding to the dimension D of 19.3 mm and the upper limit 94° of the arm maximum rotation angle θ and in the same way as described above, the material of the rotation center shaft 1d, 1e, 1f, 1g of the arm proximal end is changed from plastic formed integrally with the shutter base plate 1 to such a metal as stainless and the diameter of the shaft is changed from 1.6 mm to 1.0 mm. Accompanied by this, the radius of the external periphery of the proximal end of each arm of the front curtain and the rear curtain is reduced by 0.3 mm. Consequently, the front curtain and the rear curtain can be approached to each other by 0.3 mm each in the vertical direction.

Additionally, if the portion 1k adjacent the finder eyepiece optical path of a camera is allowed to be into the same vertical size of the shutter as the first conventional example without being enlarged, the first arm of both the front curtain and the rear curtain can be moved by 0.8 mm in the vertical direction.

Accordingly, if gathering these, the dimension E is 9.56 mm. Under the same looseness condition as the above-described conventional example as shown in FIG. 9, the inclination angle of the slit forming edge is 0° 16' 59' and the distance in the blade traveling direction on both ends of the slit forming edge is 0.21 mm, and the degree of restriction on the inclination of the slit forming edge is improved as compared to the conventional example. In the meantime, if the dimension E is increased, the finder eyepiece optical path of a camera is affected or the vertical dimension of the shutter is increased, which are unfavorable.

Therefore, the dimension E is expressed in a following relation expression.

$$(8.25/24.7)A \leq E \leq (9.56/24.7)A \therefore 0.33A \leq E \leq 0.39A \qquad (5)$$

The dimension E can be selected freely within the scope of the dimension E specified by the above expression (5) according to the technique of the present invention.

According to the first embodiment as described above, the dimension B from the end face on the arm proximal end side (left side in FIG. 3) of the shutter opening 1a to the end face on the side supporting the arm proximal end of the shutter base plate 1, the dimension C from the end face on the blade front end side of the shutter opening 1a to the end face of the shutter base plate 1 on the blade front end side (right side in FIG. 3), the dimension D from the rotation center of the arm proximal end to the rotation center of the caulking dowel supporting the slit forming blade at the arm front end, the arm maximum rotation angle θ around the rotation center of the arm proximal end and the dimension E between the first arm and the second arm which are of a parallel link constituted of the first arm and the second arm can be selected independently within the scope specified by the expressions (1) to (5).

As shown in FIGS. 8 to 10, there are combinations suitable for various dimensions (with good balance). The dimension D and θ serve mainly for the miniaturization and the dimension E concerns adjustment for interference avoidance of the blade joint portions and maintenance of parallelism of the slit forming blades. Devising the arrangement of the blade joint portions (caulking dowel in the joint portion) on the arm makes adjustment for interference avoidance of the blade joint portions and secures light-shielding by maintaining the blade overlapping amount. The dimensions B, C are introduced from D, θ and E.

Next, in the shutter device of the first embodiment near the optimal balance miniaturized according to the technique of the present invention, the angle α is an angle formed between a straight line X and a line L connecting the rotation center of the proximal end of the first arm 14 with the rotation center of the caulking dowel 16a at the front end of the same arm with the first arm 14 being located at a movable end (overcharge max state) when the rear curtain is overlapped as shown in FIGS. 5A and 5B and the angle α is 48.1°.

Because the dimension D from the rotation center of the proximal end of the first and second arms constituting a parallel link to the rotation center of the caulking dowel supporting the slit forming blades is 19.8 mm, a traveling distance Δy of the slit forming blade 10 per unit angle in the traveling direction from a state in which the first arm 14 is located at the movable end when the rear curtain is overlapped is 0.23 mm/deg.

As described above, unless no adjustment or the like is made in the focal plane shutter, the start position held before exposure of the blades or the over-charge position may be deflected by about 1° in terms of arm rotation angle due to disparity of component accuracy or assembly error.

Therefore, although as shown in FIG. 3, the rear curtain is maintained at the start position at an angle 45.1°, which is in the vicinity of this angle α=48.1°, it comes that Δy=0.24 mm/deg at the start position, which is sufficiently smaller than Δy=0.32 mm/deg or other conventional examples.

For the reason, deflection of the start position of the rear curtain slit forming blade due to deflection of a position (angle) maintained by a control magnet (not shown) is sufficiently smaller than the conventional example. Therefore, the second-basis accuracy can be maintained in a more excellent condition than the conventional example.

Likewise, the traveling distance of the slit forming blade 10 per unit angle at the rear curtain maximum charging angle (overcharge max) position is about Δy=0.23 mm/deg, which is sufficiently smaller than Δy=0.3 mm/deg of the first conventional example or other conventional examples.

Therefore, to determine the position of a lower edge of the finder portion by providing an allowance considering this deflection, this is more effective for reducing the height of a camera than the conventional example.

Further, the lower limit value of the angle α is so preferably 45° that the traveling distance Δy of the slit forming blade 10 per unit angle at the rear curtain maximum charging angle (over-charge max) position is about 0.25 mm/deg, which is smaller by about 20% than the conventional example.

Moreover, the upper limit of the angle α is so preferably 50° that the traveling distance Δy of the slit forming blade 10 per unit angle at the rear curtain maximum charging angle (over-charge max) position is about 0.22 mm/deg, which is smaller by about 27% than the conventional example.

Therefore, the angle α is expressed by the following relation expression.

$$\therefore 45° \leq \alpha \leq 50° \qquad (6)$$

The angle α can be selected freely within the scope specified by the above expression (6) according to the technique of the present invention.

The dimension D from the rotation center of the arm proximal end described above to the rotation center of the caulking dowel for supporting the slit forming blade at the arm front end is related to the angle α.

Because the dimension D can be selected in a range of $0.78A \leq D \leq 0.90A$, it is preferable to reduce D=0.78A as the dimension D so as to increase the range of the angle α. Particularly, to increase the angle α, it is necessary to decrease D=0.78A (=19.3 mm) as the dimension D in order to accommodate the first arm 14 in a space off the finder eyepiece optical system.

As for the front curtain, α and Δy are the same as the rear curtain and therefore, deflection in the blade position at the traveling completion state can be reduced. Therefore, this is effective for reducing the size of the shutter by placing the lower end 1n of the shutter near the shutter opening 1a and suitable for improvement of blade durability by stabilizing a front curtain contact position to the front curtain stopper rubber 22.

Next, according to the first conventional example, the distance H and the width W in the blade traveling direction of the slit forming blade are H=1.4 mm and W=8.8 mm, so that the relation between H and W is H=0.159W.

In contrast, according to the first embodiment, H=2.7 mm and W=8.6 mm and the relation between H and W is H=0.314W.

According to this embodiment, to increase the angle α in a condition that the first arm 14 is located at the movable end when the rear curtain is overlapped, the first arm 14 is accommodated in a region having an recess in space for the camera finder eyepiece optical system. Further, it is preferable that H is large while W is small in order to minimize the size up to the shutter top end 1k located at the top portion of the shutter opening 1a, lower the lower edge position of the finder eyepiece optical system and reduce the height of the camera for miniaturization.

Thus, H/W indicating the ratio between H and W is desired to be a larger value. In this point of view, according to this embodiment, the ratio between H and W is twice the first conventional example, which indicates that reducing the height of a camera provides a large effect.

A second conventional example is different from this embodiment in viewpoint of the structure and its second blade (blade adjacent the slit forming blade) supported by the front end of the third arm is similar to this embodiment.

If the ratio between H and W is calculated according to a third conventional example, it comes that H=0.188W.

If the ratio between H and W is calculated according to a fourth conventional example, it comes that H=0.222W.

Further, if the ratio between H and W is calculated with a conventional shutter, H=0.27W is its maximum.

Therefore, it can be considered that an effect of miniaturization is generated by employing H=0.3W as the lower limit of H.

The upper limit of H will be described below. Because recent cameras have incorporated a motor internally so that the front curtain and the rear curtain are moved to a traveling preparation position immediately after exposure is completed, shielding of light is executed by the front curtain under a normal condition of the camera, while the rear curtain only can shield from light to such an extent that no fault occurs upon operation for exposure. Therefore, although according to the first embodiment, the overlapping amount between adjacent blades is 2 mm when the rear curtain is expanded, this overlapping amount is 1.25 mm and the width in the traveling direction of each blade is smaller by 0.5 mm than the first embodiment.

Therefore, H=3.2 mm, W=8.1 mm and the relation between H and W is H=0.4W.

Thus, the distance H can be expressed in a following relation expression.

$$\therefore 0.3W \leq H \leq 0.4W \tag{7}$$

The distance H can be selected freely within the range specified by the above expression (7) according to the technique of the present invention.

Next, a distance $H_2$ (width $W_2$ of the second blade in the rear curtain in the blade traveling direction) is $H_2$=1.2 mm, $W_2$=8.8 mm and the relation between $H_2$ and $W_2$ is $H_2$=0.136$W_2$.

Contrary to this, according to this embodiment, $H_2$=2.25 mm, $W_2$=8.6 mm and the relation between $H_2$ and $W_2$ is $H_2$=0.262$W_2$.

According to this embodiment, to increase the angle α in a condition that the first arm 14 is located at the movable end when the rear curtain is overlapped, the first arm 14 is accommodated in a region having an recess in space for the camera finder eyepiece optical system. Further, it is preferable that $H_2$ is large while $W_2$ is small in order to minimize the size up to the shutter top end 1k located at the top portion of the shutter opening 1a, lower the lower edge position of the finder eyepiece optical system and reduce the height of the camera for miniaturization.

Thus, $H_2/W_2$ indicating the ratio between $H_2$ and $W_2$ is desired to be a larger value. In this point of view, according to this embodiment, the ratio between $H_2$ and $W_2$ is twice the first conventional example, which indicates that reducing the height of a camera provides a large effect.

A second conventional example is different from this embodiment in viewpoint of the structure and its second blade (blade adjacent the slit forming blade) supported by the front end of the third arm is similar to this embodiment.

If the ratio between $H_2$ and $W_2$ is calculated according to the third conventional example, it comes that $H_2$=0.125$W_2$.

If the ratio between $H_2$ and $W_2$ is calculated according to the fourth conventional example, it comes that $H_2$=0.167$W_2$.

Further, if the ratio between $H_2$ and $W_2$ is calculated with the conventional shutter, $H_2$=0.24$W_2$ is its maximum.

Therefore, it can be considered that an effect of miniaturization is generated by employing $H_2$=0.26$W_2$ as the lower limit of $H_2$.

The upper limit of $H_2$ will be described below. Because recent cameras have incorporated a motor internally as described above, so that the front curtain and the rear curtain are moved to a traveling preparation position immediately after exposure is completed, shielding of light is executed by the front curtain under a normal condition of the camera, while the rear curtain only can shield from light to such an extent that no fault occurs upon operation for exposure. Therefore, although according to the first embodiment, the overlapping amount between adjacent blades is 2 mm when the rear curtain is expanded, this overlapping amount is 1.25 mm and the width in the traveling direction of each blade is smaller by 0.5 mm than the first embodiment.

Therefore, $H_2$=2.75 mm, $W_2$=8.1 mm and the relation between $H_2$ and $W_2$ is $H_2$=0.34$W_2$.

Thus, the distance $H_2$ can be expressed in a following relation expression.

$$\therefore 0.26W_2 \leq H \leq 0.34W_2 \tag{8}$$

The distance $H_2$ can be selected freely within the range specified by the above expression (8) according to the technique of the present invention.

Because as described above, according to the first embodiment, the angle α is larger than the conventional example, deflection in the start position of the rear curtain slit forming blade 10 is so small that the second-basis accuracy can be maintained in an excellent condition.

Further, because deflection in the rear curtain blade group position is small with respect to deflection in the rear curtain maximum charging angle (over-charge max), the lower edge of the finder portion which should be determined by providing with an allowance considering this can be lowered and further, the height of the camera can be reduced.

Additionally, the lower edge of the finger portion can be lowered by increasing the distance H and the H/W, which is a ratio between H and W also, so that the height of the camera can be reduced further.

Moreover, by using the same space commonly in the operating region of the driving pins 20a, 21a (joint portions with the arm) of the driving levers 20, 21 and the slit forming blade with a time shift in order to prevent an interference from occurring in the operation, an extension amount of the end portion on the arm proximal end side of the slit forming edge can be increased, which is effective for reduction of the size in a direction perpendicular to (horizontal direction) the blade traveling direction.

Consequently, in a short-arm type having a large arm rotation angle, the length of the arm can be shortened, interference avoiding adjustment for the caulking dowel connecting the blade to the arm is carried out, light-shielding performance is secured by keeping the blade overlapping amount and deterioration of the parallelism of an exposure slit can be prevented by enlarging a link interval between the arms. Further, operating resistance/inertia are kept small without complicating the structure of the blade unit, and to aim at miniaturization of the shutter in a shape suitable for high-speed operation, the size in a direction perpendicular to the blade traveling direction and the size up to the top end of the shutter located above the shutter opening can be reduced.

Also, if the curtain velocity is kept equal to the conventional example without using the advantage that the inertia of the blade unit is small, necessary shutter charging energy decreases, so that the charging structure becomes simple and thin. Thus, the shutter device and camera can be miniaturized. Further, favorably, film feed velocity at continuous shooting can be increased.

(Second Embodiment)

FIGS. 13 to 21 show an image display device having a shutter device according to the second embodiment of the present invention.

This image display device is suitable for a photo stand, an electronic album or the like, which stores a negative image by projecting it optically to a spatial light modulator (hereinafter referred to as SLM) serving as memory display means and allows the negative image to be seen like a negative film which ordinary user uses by displaying it by inversion. More specifically, in the image display device of this embodiment, the negative image is written instantaneously with a strobe lamp used in a camera by employing ferroelectric liquid crystal (hereinafter referred to as FLC) having a memory performance as liquid crystal of the SLM and then, that image is observed through reading beam.

Figure 13:
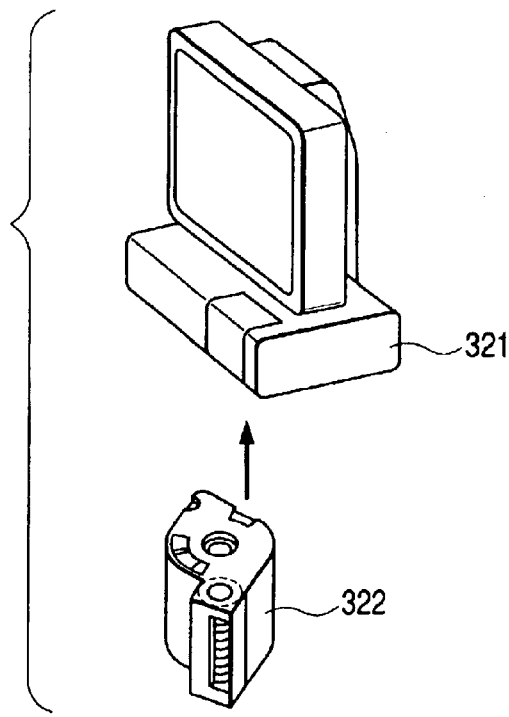
FIG. 13 is a usage image view of an image display device using a shutter device according to a second embodiment of the present invention.

FIG. 13 shows an image about use of an image display device 321 of this embodiment. By loading a developed IX240 film (hereinafter referred to as D cart) 322 as the negative film in the image display device 321, a photographed image on a film is inverted from the negative image to its positive image and displayed as a high precision image.

Figure 14:
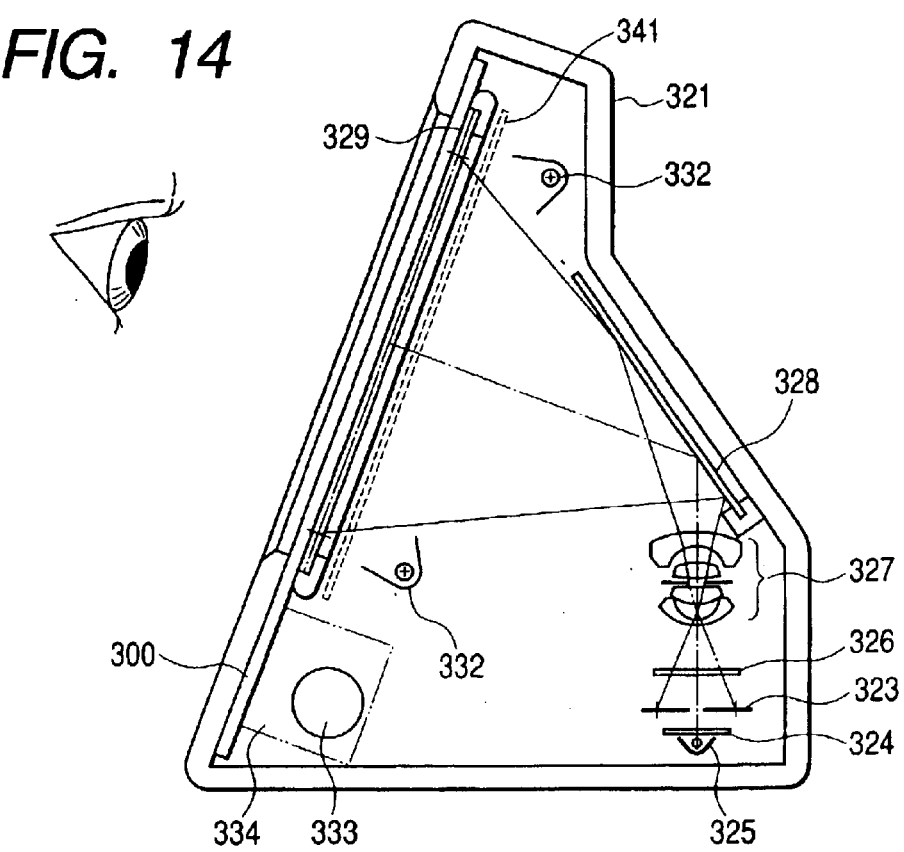
FIG. 14 is an internal structure view of the image display device.

FIG. 14 shows an internal structure of the image display device 321. In this figure, reference numeral 323 designates a negative film developed which is pulled out from the D cart 322 and contains a photographed image. This negative film 323 is indexed for each frame to a position indicated in the same figure (writing position opposing an aperture (not shown)) by means of a film feed mechanism (not shown).

Reference numeral 324 denotes a milky diffusion plate, which diffuses light irradiated from a strobe unit 325, which will be described later, equally so as to illuminate a frame set at the writing position of a negative film 323.

Reference numeral 325 denotes a strobe unit, which is a same type as used in an ordinary camera and comprises a Xe tube, a reflector, a light emission circuit and the like. This strobe unit emits light according to a trigger signal from a micro processor (not shown).

Reference numeral 326 denotes an orange base removing filter which serves for removing orange base color form a negative image and comprises an optical filter colored in blue which is a complementary color of orange.

Reference numeral 327 denotes a projection lens, which projects a negative image on the negative film 323 onto a photo-electric conversion layer of the SLM 329 through a reflection mirror 328 at a predetermined magnification.

Reference numeral 329 denotes the SLM, which will be described in detail with reference to FIGS. 15A and 15B. In the meantime, FIG. 15A shows a state in which an image is written into the SLM 329 and FIG. 15B shows a state in which the image is observed.

Figure 15A:
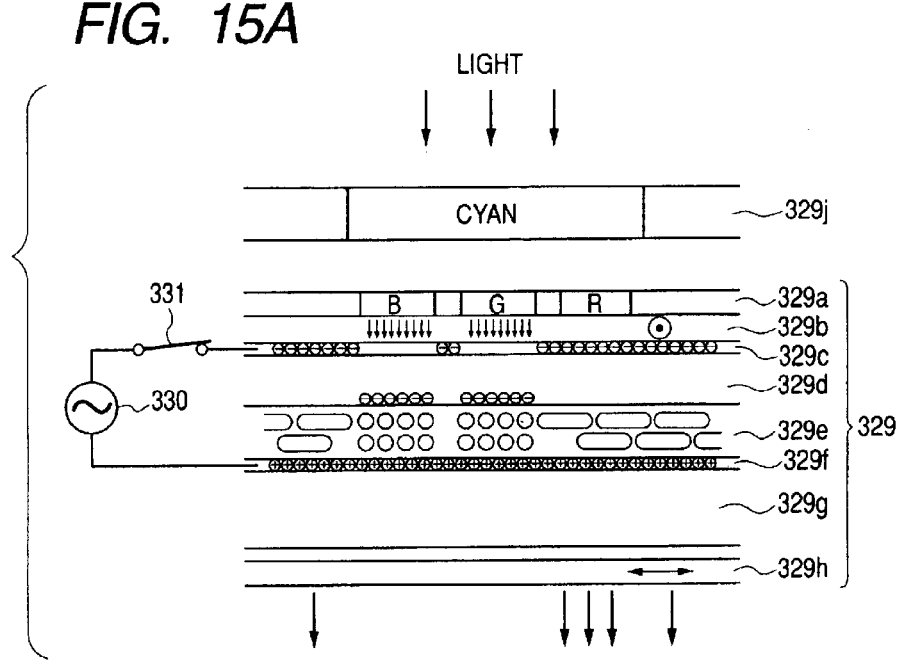
FIGS. 15A and 15B are views showing the structure and operation of an SLM for use in the image display device.
Figure 15B:
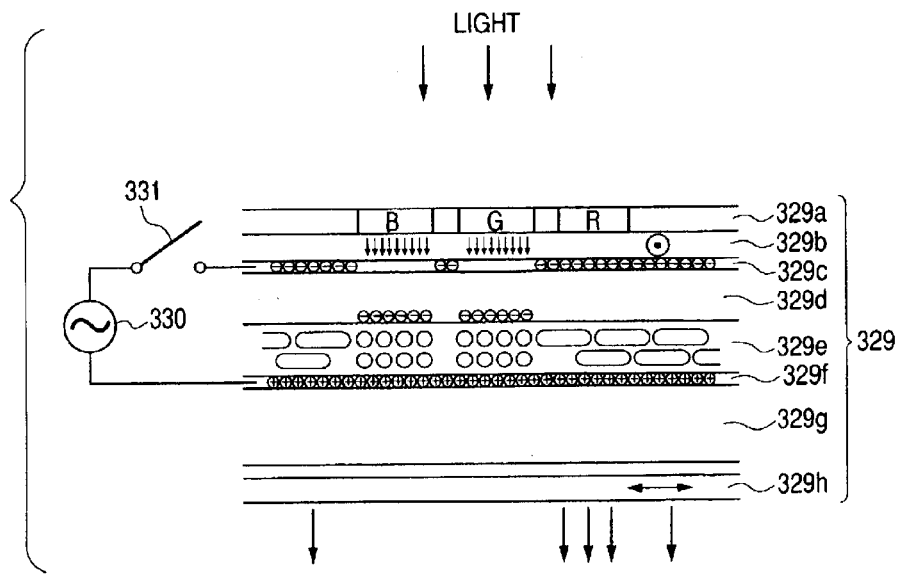

Referring to FIGS. 15A and 15B, reference numeral 329a denotes a color filter of a saturated color or a complementary color. As this color filter 329a, a fine filter, which is used for an image pickup device CCD used in a video camera or the like, is preferable for this image display device because it allows observation of a silver salt image without inducing deterioration.

Reference numerals 329b and 329h denote deflecting plates in which liquid crystal layer described later is sandwiched. The structures of FIGS. 15A and 15B have so-called cross-Nicol structure, so that the deflection direction is from the rear to the front with respect to the paper surface in case of 329b while it is from the left to the right with respect to the paper surface in case of 329h.

Reference numerals 329c and 329f denote transparent conductive film (hereinafter referred to as ITO film) usually composed of indium oxide or the like and when power is supplied from an AC power supply 330 or a circuit for driving this (not shown) through a SW 331, potentials having different polarities are generated on the ITO film 329c, 329f.

Reference numeral 329d denotes photoconductor layer, which is formed of a photo-diode such as amorphous film or OPC (organic semiconductor film). One face of this photoconductor layer 329d is attached firmly to an ITO film 329c while the other face thereof is attached firmly to an FLC 329e, which will be described later.

Reference numeral 329e denotes FLC which is a liquid crystal layer and one face thereof is attached firmly to the photoconductor layer 329d while the other face thereof is attached firmly to the above-described ITO film 329f.

Reference numeral 329g denotes glass, which takes a role for sealing the liquid crystal layer and protecting other layers at the same time.

Reference numeral 329j denotes a negative film image drawn for explaining an image (virtual image) projected from a negative film 323 projected from the above-described projection lens 327.

Referring to FIG. 14, reference numeral 332 denotes a straight pipe type reading illuminating light source often used for a flat display or the like. Reference numeral 300 denotes a shutter device disposed in front of (outside) the SLM 329.

Figure 17:
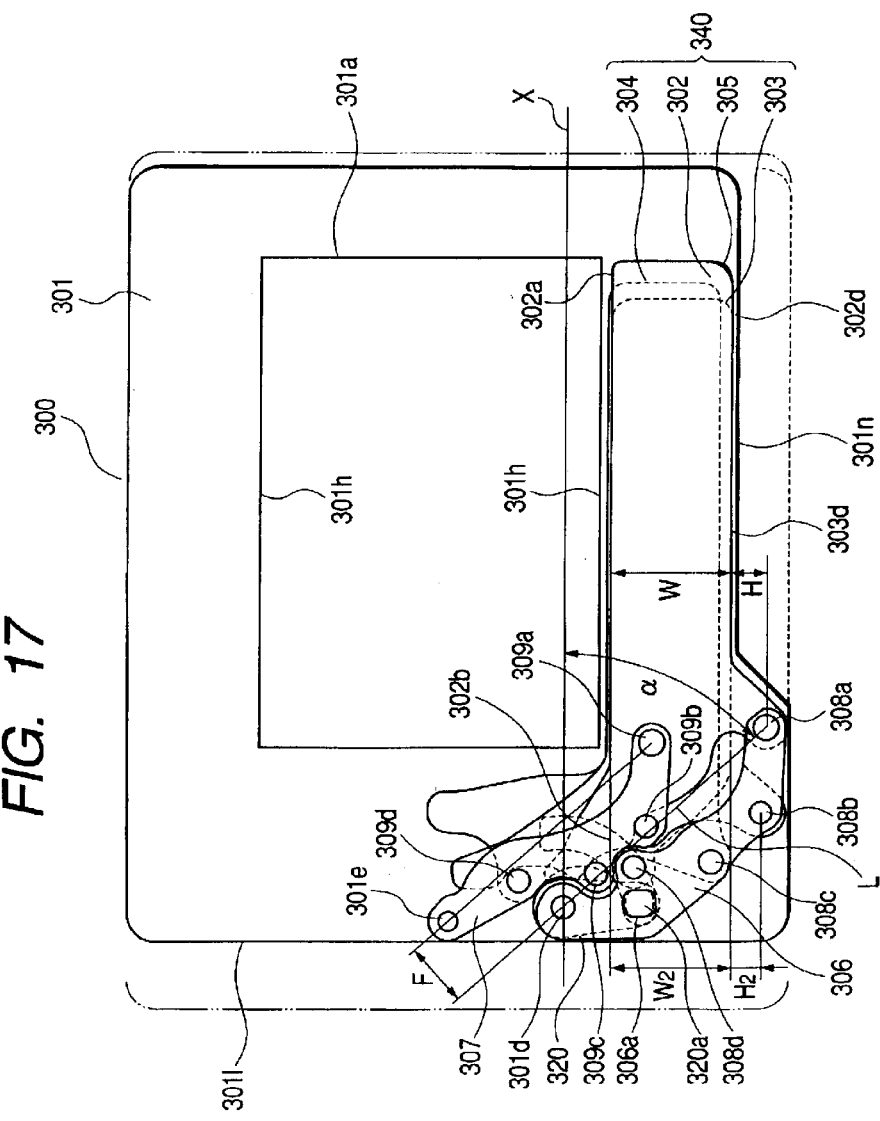
FIG. 17 is a front view showing a closing state of the shutter device according to the second embodiment.

FIGS. 16 and 17 show the structure of the shutter device 300. FIG. 16 shows a state in which the shutter is closed, indicating a state in which a screen of the SLM 329 is shielded from external light. FIG. 17 shows a state in which the shutter is opened, indicating a state in which an image displayed on the screen of the SLM 329 can be observed.

Referring to these figures, reference numeral 301 denotes a shutter base plate and reference numeral 301a denotes a shutter opening formed substantially in the center of the shutter base plate 1. Reference numeral 301b denotes a circular hole, which is formed in the left side portion of the shutter opening 301a in the shutter base plate 301 and secures a moving trajectory of the driving pin 320a of the driving lever 320 for driving the blade unit.

The driving lever 320 is rotatable around a rotation shaft (not shown) formed by extending the shaft 301d coaxially and is rotated when a driving power generated in a motor 333 is transmitted through a gear column 334 (indicated with dot chain line in FIG. 14).

Reference numeral 302 denotes a first blade (light-shielding blade) for use as a slit forming blade and reference numeral 302a denotes a light-shielding edge extending in the length direction (right/left direction) of the first blade 302. Reference numeral 302b denotes an end portion (hereinafter referred to as light-shielding edge) on the arm proximal end side of the light shielding edge 302a. Reference numerals 303 to 305 denote covering blades (light-shielding blades), reference numeral 303 denotes a second blade, reference numeral 304 denotes a third blade and reference numeral 305 denotes a fourth blade.

Reference numeral 306 denotes a first arm and its proximal portion 306 is mounted freely rotatably around a shaft 301d formed on a shutter base plate 301. A left portion of the first blade 302 is supported freely rotatably at a front end of the first arm 306 through a caulking dowel 308a.

Reference numeral 306a denotes a hole portion formed in the first arm 306 and for a driving pin 320a of the driving lever 320 to engage without any clearance. Engagement of the driving pin 320a with this hole portion 306a transmits a driving force from the driving lever 320 so as to rotate the first arm 306.

Reference numeral 307 denotes a second arm and its proximal end 307b is mounted freely around a shaft 301e formed on a shutter base plate 301. Further, a left portion of the first blade 302 is supported freely rotatably at a front end of this second arm 307 through a caulking dowel 309a. In this way, a parallel link is formed of the first blade 302 and the first and second arms 306, 307.

Likewise, left portions of covering blades 303, 304, 305 are joined to intermediate portions of the first arm 306 and the second arm 307 freely rotatably through caulking dowels 308b, 309b, 308c, 309c, 308d, 309d so that parallel links are formed. In the above-described way, the blade unit 340 of the shutter device 300 is constructed.

In a state in which the shutter device 300 opens the screen of the SLM 329 as shown in FIG. 17, a light-shielding edge portion 302b of the first blade 302 is located within the movable region of the driving pin 320a. If the expansion operation for closing the shutter opening of the blade unit is started, the light-shielding edge portion 302b is moved out of the movable region of the driving pin 320a so as to avoid an interference with the driving pin 320a.

In a state of the movable end when the blade group (unit) is overlapped as shown in FIG. 17, L indicates a line connecting the rotation center of a proximal portion of the first arm 306 with the rotation center of the caulking dowel 308a at the front portion of the same arm, X indicates a line extending through the rotation center of the proximal end of the first arm 306 in a direction perpendicular (horizontal direction) to the blade traveling direction and in parallel to a face of the shutter opening 301a. α indicates an angle formed between L and X.

In the blade unit 340, a distance between the rotation center of a caulking dowel 308a, which is a joint member provided on the first arm 306 for supporting the first blade 302 at the front end of the first arm 306 and an end face 302d substantially perpendicular to the blade traveling direction near the rotation center of the caulking dowel 308a in the first blade 302 is assumed to be H while the width in the blade traveling direction of the first blade 302 is assumed to be W.

In the blade unit 340, a distance between the rotation center of the caulking dowel 308b, which is a joint member for supporting the second blade 303 adjacent the first blade 302 joined to the front end of the first arm 306 on the first arm 306 and an end face 303d substantially perpendicular to the blade traveling direction near the rotation center of the caulking dowel 308b on the second blade 303 is assumed to be $H_2$ while the width in the blade traveling direction of the second blade 303 is assumed to be $W_2$.

Figure 18:
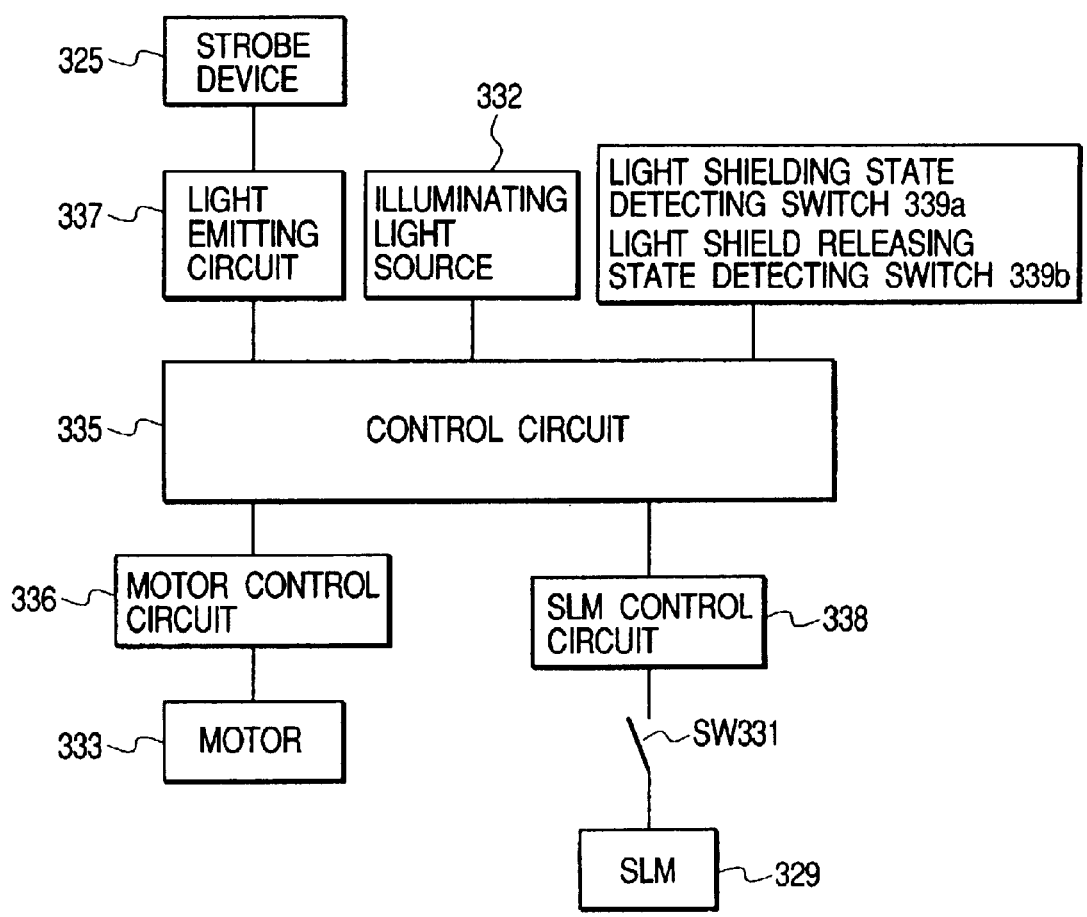
FIG. 18 is an electric circuit block diagram of the image display device.

FIG. 18 shows an electric circuit structure of this image display device 321. Referring to this figure, reference numeral 335 denotes a control circuit for controlling the entire sequence of the image display device 321. Reference numeral 336 denotes a motor control circuit for controlling the normal/reverse rotation of the motor 333 which is a driving power source of the shutter device 300. Reference numeral 337 denotes a light emitting circuit for controlling light emission from a strobe device 325. Reference numeral 338 denotes a SLM control circuit for controlling the SW 331 for turning ON/OFF power supply to the SLM 329. Reference numeral 339a denotes a light shielding state detecting switch, which is turned ON when the blade unit 340 of the shutter device 300 closes the shutter opening 301a completely. Reference numeral 339b denote a light shield releasing state detecting switch, which is turned ON when the blade unit 340 opens the shutter opening 301a completely.

Referring to FIG. 14, reference numeral 341 denotes a diffusion sheet, which interlocks with the blade unit 340. When the blade unit 340 is changed from the closing state to the open state, a state in which the rear face of the SLM 329 is covered is changed to a state in which it is covered by a sheet driving mechanism (not shown). If a reading illuminating light source 332 is turned ON with the rear face of the SLM 329 covered by the diffusion sheet 341, its illumination light is diffused by the diffusion sheet 341 so that it is projected substantially equally to the SLM 329. Then, if the blade unit 340 is closed, the diffusion sheet is driven so as to retreat from the rear face of the SLM 329.

Figure 19:
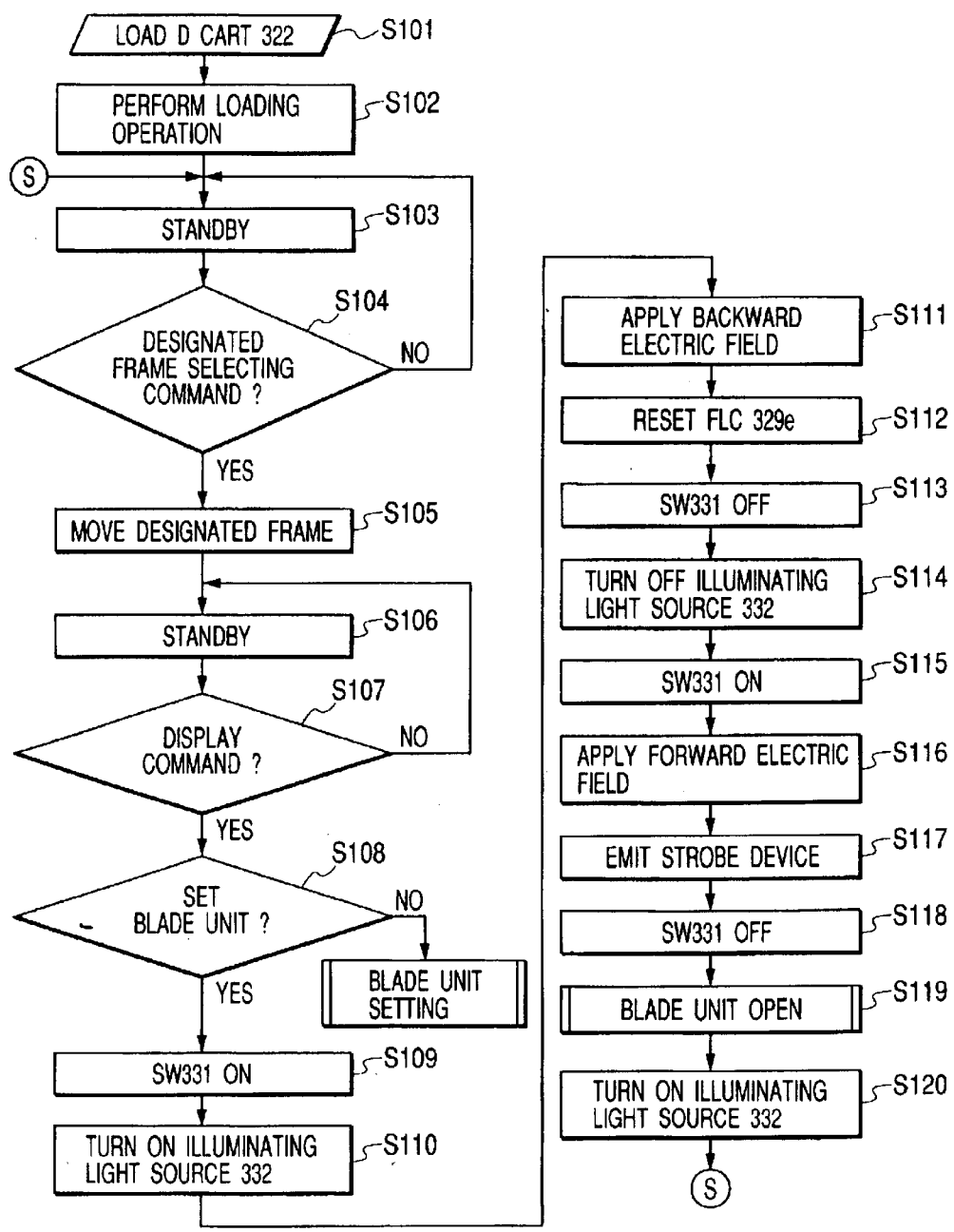
FIG. 19 is a flow chart about the operation of the image display device.

Next, the operation of the image display device 321 (mainly the control circuit 335) will be described with reference to a flow chart shown in FIG. 19. In the meantime, this flow chart is started when the D cart 322 is loaded on the image display device 321 and at this time, the blade unit 340 is closed, so that user cannot observe any image in the SLM 329.

If user loads the D cart 322 on the image display device 321 (S101), the control circuit 335 executes thrust motion for feeding the negative film 323 in the D cart 322 by activating a film feed mechanism and positions and stops a first frame of the film at a write position in the image display device 321 (S102). With this state, standby mode of waiting for acceptance of a signal from each switch (not shown) is turned ON with this state (S103).

If a signal for feeding the screen up to some frame enters from a remote controller or the like (S104), the film feed mechanism is activated so that a specified frame is moved to a write position in the image display device 321 (S105) and then, the image display device 321 stands by for a command which specifies whether or not this frame is to be displayed (S106).

If a display command is received from user in this standby state (S107), the control circuit 335 detects a state of the light shield state detecting switch 339a (S108). Because here, the blade unit 340 executes deletion of a previously displayed frame image from the SLM 329 and writing of a new image into the SLM 329 after shielding from external light to the image display device 321 completely, whether or not the blade unit 340 is set to its closing state is confirmed.

Then, if the light shield state detecting switch 339a is turned ON, the processing proceeds to S109 and if it is turned OFF, the processing proceeds to blade unit set subroutine. In the meantime, this blade unit set subroutine will be described later.

In S109, the control circuit 335 turns ON the SW 331 so as to delete the previously displayed frame image from the SLM 329 (S109), turns ON the reading illuminating light source 332 (S110) and applies an electric field reverse to image writing time by means of an AC power source 330 (S111).

Consequently, all the FLCs 329e are inverted to their sideway state, in which state part of those shown in FIGS. 15A and 15B are already placed, so that a neutral condition is attained (S112). After a sufficient time necessary for all the cells to turn to the above described state passes and the reset operation is carried out, the SW 331 is turned OFF (S113) and the reading illuminating light source 332 is turned OFF (S114).

A flow of the operation for writing a new image will be described from here. The image display device 321 is placed on a desk in office or a shelf provided on house's wall for example and used under external light of about several hundreds lux. When the external light passes a deflecting plate 329*h* and a liquid crystal layer 329*e*, its brightness is reduced by about half and the light impinges on the photoconductor layer 329*d*. When the SW 331 is turned OFF, no electric field is applied between the ITO films 329*c* and 329*f*, so that the FLC 329*e* does not react.

Thus, after the control circuit 335 turns ON the SW 331 so as to supply with electricity (S115), forward electric field necessary for writing an image is applied to the ITO films 329*c*, 329*f* from the AC power source 330 (S116). Then, the strobe device 325 is illuminated (S117) and an image on the negative film 323 is projected to the SLM 329 by the strobe light so that that image is written into the SLM 329.

Because the strobe light illumination executed in S117 is executed in about 500 $\mu$sec, turning ON of the SW 331 executed in S116 is carried out in about the same time and timing, and immediately after the illumination is ended, the SW 331 is turned OFF so as to cut electric field (S118).

Because the blade unit 340 is opened for user to be able to observe an image stored in the SLM 329, the processing proceeds to blade unit open subroutine (S119). In the meantime, this blade unit open subroutine will be described later.

If the blade unit 340 is opened, the reading illuminating light source 332 is lit to such a condition that user can recognize the image written in the SLM 329 based on transmission illumination system (S120). After that, the control circuit 321 turns to standby state ready for accepting a next command (S103).

Figure 20:
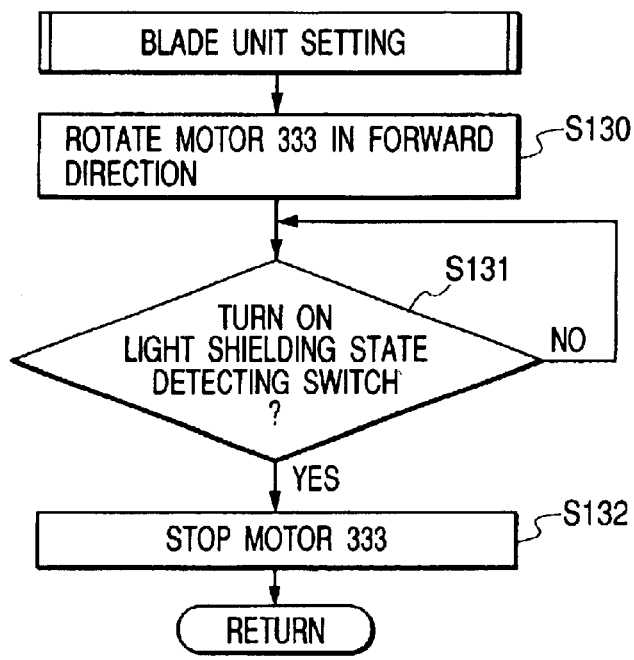
FIG. 20 is a flow chart about the operation of the image display device.

Next, the above-described blade unit set subroutine will be described with reference to FIG. 20. To close the blade unit 340, the control circuit 335 rotates the motor 333 in normal direction (S130). The normal rotation of the motor 333 is transmitted to the first arm 306 shown in FIG. 17 through the gear column 334 and the driving lever 320, so that the first arm 306 is rotated in a counterclockwise direction around the shaft 301*d* in FIG. 17. Consequently, the blade unit 340 travels from the open state (blade overlapping state) shown in FIG. 17 to the closing state (blade expansion state) shown in FIG. 16. Then, interlocking with the closing action of the blade unit 340, the sheet driving mechanism retracts the diffusion sheet 341 from a position where it covers the SLM 329, so as to enable to write an image into the SLM 329. Further, the light shield state detecting switch 339*a* is changed from OFF to ON substantially at the same timing as when the blade unit 340 turns to the closing state. Thus, the control circuit 335 detects that the blade unit 340 has closed the shutter opening 301*a* of the image display device 321 completely (S131) and a signal for stopping the rotation of the motor is outputted to the motor control circuit 336. Consequently, the rotation of the motor is stopped (S132) and then, this subroutine is ended.

Figure 21:
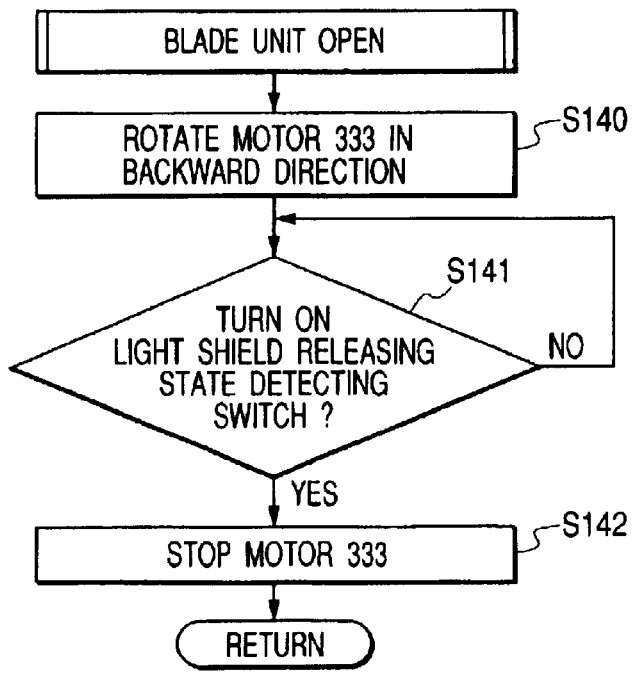
FIG. 21 is a flow chart about the operation of the image display device.

Next, the above-described blade unit open subroutine will be described with reference to FIG. 21. To open the blade unit 340, the control circuit 335 rotates the motor 333 in reverse direction (S140). This reverse rotation of the motor 333 is transmitted to the first arm 306 shown in FIG. 16 through the gear column 334 and the driving lever 320, so that the first arm 306 is rotated in a clockwise direction around the shaft 301*d* in FIG. 16. Consequently, the blade unit 340 travels from the closing state (blade expansion state) of FIG. 16 to the open state (blade overlapping state) of FIG. 17. Interlocking with the opening action of this blade unit 340, the sheet driving mechanism drives the diffusion sheet 341 to a position where it covers the SLM 329 and illumination light from the reading illuminating light source 332 illuminates the SLM 329 equally so that user can observe a clear image without any unevenness. Further, at the same timing as when the blade unit 340 turns to the open state (light shield releasing state), the light shield releasing state detecting switch 339*b* is changed from OFF to ON. Thus, the control circuit 335 detects that the blade unit 340 opens the shutter opening 301*a* of the image display device 321 completely (S141) and consequently, a signal for stopping the rotation of the motor is outputted to the motor control circuit 336. As a result, the rotation of the motor 333 is stopped (S142) and this subroutine is ended.

As described above, the image display device of this embodiment is capable of excluding noises in images due to influence from external light, which are generated in a conventional image display device in which the SLM 329 is exposed to external light when an image is written, by blocking intrusion of external light into the SLM 329 with the blade unit 340 closed at the time of writing the image. Therefore, a necessity of projecting a film image with a large amount of light from the strobe device 325 to make a clear image is eliminated and consequently, the size of the strobe device 325 can be reduced, thereby leading to compactness of the size of the entire image display device 321.

Further, the necessity of making the projection lens 327 FNO. Brighter is also eliminated, so that the outside diameter of a lens of the projection optical system can be designed in a compact shape, thereby leading to a further compactness of the image display device 321. Further, image writing time can be reduced largely.

The shutter device 300 of this embodiment is to be loaded on the image display device 321 aiming at observing a displayed image on the SLM 329 of a predetermined curtain size (for example, 75 mm vertically and 111 mm horizontally) and for example, the vertical size A of the shutter opening 301*a* is set to 74.1 mm while the horizontal size thereof is set to 109.8 mm. To reduce the size of this shutter device 300, it is necessary to reduce the sizes of components around the shutter opening 301*a*.

Referring to FIGS. 16 and 17, the lateral width of a left side portion (dimension from a left end face of the shutter opening 301*a* to an end face on the left side of the shutter base plate 301) of the shutter opening 301*a* in the shutter base plate 301 is assumed to be B while the lateral width of a right side portion (dimension from a right end face of the shutter opening 301*a* to an end face on the right side of the shutter base plate 301) of the shutter opening 301*a* in the shutter base plate 301 is assumed to be C. Further, a dimension from the rotation center of each of the rotation shafts 301*d*, 301*e* at the arm proximal end to the center of each of the caulking dowels 309*a*, 309*b* joining the first blade 302 to the arm front end is assumed to be D. The maximum rotation angle around each of the rotation shafts 301*d*, 301*e* in the arms 306, 307 is assumed to be $\theta$ and a dimension of the gap between the first arm 306 and the second arm 307 (dimension of the gap between the rotation shafts 301*d* and 301*e*) constituting a parallel link is assumed to be E. Then, points which should be noticed for reducing the size of the shutter device 300 will be described below.

The external shape of a shutter device indicated by two-dot chain line in FIGS. 16 and 17 shows a case where a conventional blade unit is employed. Because in conclusion, the shutter device 300 of this embodiment adopts the same structure as that described in the first embodiment, the lateral dimension (right-left dimension) of the shutter device 300 is smaller by 18 mm than the conventional example.

Because according to this embodiment, the blade unit 340 is so constructed that the caulking dowels protrude or retract alternately when the blades overlap like the first embodiment, the rotation angle of the arm can be increased. Because when the blades overlap, the caulking dowels 308c, 309c, 308d, 309d of the two blades (third blade, fourth blade) 304, 305 disposed near the arm proximal end approach the left end portion 301l of the shutter base plate external shape and can be disposed along the left side end portion 301l, a distance in the right/left direction between the caulking dowels 308c and 308d and a distance in the right/left direction between the caulking dowels 309c and 309d are 1.32 mm. If the maximum angle 4° corresponding to the over-charge amount is considered, the distance in the right/left direction when the blades overlap can be made substantially 0 (zero). Therefore, the shutter device 300 can be reduced in size in a direction perpendicular to the blade traveling direction (right/left direction).

The points which should be noticed (including the arrangement of the caulking dowels), the dimensions C–E and the arm maximum operating angle θ are the same as described in the first embodiment and the relation expressions (1) to (8) introduced about the first embodiment are valid for the shutter device 300 of this embodiment.

The shutter device 300 of this embodiment has a combination appropriate for each dimension of the gap like the first embodiment (with a good balance) and the dimension D and the angle θ are factors which determine mainly reduction of the size. Then, interference avoidance adjustment of the caulking dowels and maintaining of parallelism of the first blade 302 are carried out depending on the dimension E and the interference avoidance adjustment of the caulking dowels and securing of light-shielding performance by keeping a blade overlapping amount are carried out by devising the arrangement of the caulking dowels. In the meantime, the dimensions B, C are dimensions introduced from D, θ, E.

Further, because according to this embodiment, deflection in the storage position of the blade unit 340 when the blades overlaps can be reduced by making the angle θ larger than the conventional example, the lower edge position 301n of the shutter device 300, which is determined by providing with an allowance considering this, can be raised, so that the shutter device 300 can be reduced in size and the height of the image display device can be reduced. Additionally, the lower edge position 301n of the shutter device can be raised by increasing the distance H and the H/W, which is a ratio between H and W, so that the shutter device 300 can be miniaturized and the height of the image display device can be further reduced.

Then, in the shutter device 300 of this embodiment, an extension amount of the light shielding edge portion 302b, which is effective for reduction of the size in a direction perpendicular to the blade traveling direction, can be increased by using the same space commonly for a movable region of the joint portion (driving pin 320a) between the driving lever 320 and the arm 306 and a movable region of the first blade 302. Consequently, in the short-arm type having a large arm rotation angle, the arm length can be reduced further and the interference avoidance adjustment for the caulking dowels for jointing the blade to the arm and securing of light-shielding performance by keeping the blade overlapping amount are carried out. Further, by enlarging the gap between arm links, the parallelism of the blade unit 340 can be prevented from deteriorating. Further, the size of the shutter device 300 can be reduced into such a shape suitable for high-speed operation without complicating the structure of the blade unit 340 with its operating resistance and inertia restricted to low level, and particularly, the size thereof in a direction perpendicular to a blade traveling direction and the size thereof up to a shutter bottom end located at the bottom of the shutter opening can be decreased.

If the driving velocity is kept equal to the conventional example without using such an advantage that the inertia of the blade unit is small for improvement of the driving velocity, necessary shutter driving energy decreases, so that driving mechanisms of the motor 333, the gear column 334 and the like become simple and thin, thereby realizing the reduction in size of the image display device.

Although in the above described respective embodiments, the shutter device for a film camera or a digital camera and the shutter device for an image display device have been described, the shutter device of the present invention can be applied to other various devices than the camera and image display device.

As described above, according to this embodiment, by making the aforementioned angle α larger than the conventional example in the short-arm type shutter device, deflection in the start position of the light shielding blade connected to the arm front end in the light-shielding blade group can be suppressed thereby the shutter second-basis time accuracy being intensified. Further, deflection in the position of the light-shielding blade group with respect to deflection in maximum charging angle of the light-shielding blade group can be suppressed. Thus, the size of the shutter device itself can be reduced and the heights of the camera, image display device and other device loaded with this shutter device can be reduced.

In the short-arm type shutter device having a large arm rotation angle, the arm length can be reduced further and the interference avoidance adjustment for the caulking dowels for connecting the blade to the arm and securing of light-shielding performance by keeping the blade overlapping amount are carried out. Further, the link gap between the arm members is increased to prevent the parallelism of the light-shielding blades from deteriorating. Additionally, the size of the shutter device can be reduced into a shape appropriate for high-speed operation without complicating the structure with its operating resistance and inertia kept small, and particularly, the size thereof in a direction perpendicular to the blade traveling direction and the size thereof in the blade traveling direction can be reduced.

What is claimed is:

1. A shutter device comprising:

a shutter base plate having a shutter opening;

a first arm member which rotates with a first shaft as a rotation center relative to said shutter base plate;

a second arm member which rotates with a second shaft as a rotation center relative to said shutter base plate; and four shutter blades, wherein each of the four shutter blades is joined to said first and second arm members and when said first and second arm members rotate with respect to each shaft, each of said shutter blades travels over said shutter opening in a predetermined direction, and a brim portion protruded from said first arm member is located at a position at which a shutter blade of said four shutter blades, located at a second shortest distance from said rotation center of said first arm member is connected which said first arm member, and during an operation of opening/closing said opening of said shutter blade, only a part of said brim enters said shutter opening in a state of facing to said shutter base plate with a gap so as to block a deflection of said shutter blades.

2. A camera comprising:

a shutter base plate having a shutter opening;

a first arm member which rotates with a first shaft as a rotation center relative to said shutter base plate;

a second arm member which rotates with a second shaft as a rotation center relative to said shutter base plate; and four shutter blades, wherein each of the four shutter blades is joined to said first and second arm members and when said first and second arm members rotate with respect to each shaft, each of said shutter blades travels over said shutter opening in a predetermined direction, and a brim portion protruded from said first arm member is located at a position at which a shutter blade of said four shutter blades, located at a second shortest distance from said rotation center of said first arm member is connected which said first arm member, and during an operation of opening/closing said opening of said shutter blade, only a part of said brim enters said shutter opening in a state of facing to said shutter base plate with a gap so as to block a deflection of said shutter blades.

\* \* \* \* \*

UNITED STATES PATENT AND TRADEMARK OFFICE
CERTIFICATE OF CORRECTION

PATENT NO. : 6,776,540 B2  
DATED : August 17, 2004  
INVENTOR(S) : Yasuhiro Toyoda It is certified that error appears in the above-identified patent and that said Letters Patent is hereby corrected as shown below:

Column 10,  
Line 62, delete "shaft if" and insert -- shaft 1f --.

Column 13,  
Lines 45 and 48, delete "1$a$" and insert -- 1a --.

Column 22,  
Line 66, delete "59'" and insert -- 59" --.

Signed and Sealed this

Twenty-first Day of March, 2006

JON W. DUDAS  
*Director of the United States Patent and Trademark Office*